(12) United States Patent
Holcombe et al.

(10) Patent No.: US 12,554,758 B1
(45) Date of Patent: Feb. 17, 2026

(54) ADVANCED AGENTIC EXTRACTION FOR CONTEXT GROUNDING WITHIN AUTOMATIONS

(71) Applicant: UiPath, Inc., New York, NY (US)

(72) Inventors: Jordan Holcombe, Bellevue, WA (US); Venkata Syam Prakash Rapaka, Cupertino, CA (US); Jeremy Reist, Burlington (CA); Jingtao Ren, Redmond, WA (US); Zachariah Kourosh Eslami, Austin, TX (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 19/022,681

(22) Filed: Jan. 15, 2025

(51) Int. Cl.
*G06F 16/334* (2025.01)
*G06F 16/3332* (2025.01)
*G06V 30/416* (2022.01)

(52) U.S. Cl.
CPC ...... *G06F 16/3347* (2019.01); *G06F 16/3334* (2019.01); *G06V 30/416* (2022.01)

(58) Field of Classification Search
CPC ... G10L 15/22; G10L 2015/223; G10L 15/26; G10L 15/30; G10L 2015/088; G10L 15/1815; G10L 15/08; G10L 25/51; G10L 15/02; G10L 15/063; G10L 2015/228; G10L 13/00; G10L 15/1822; G10L 13/02; G10L 17/22; G10L 15/18; G10L 17/00; G10L 13/08; G10L 15/20; G10L 19/018; G10L 15/28; G10L 25/48; G10L 15/01; G10L 15/19; G10L 19/008; G10L 2015/0635; G10L 2015/0638; G10L 21/0208; G10L 15/00; G10L 2015/221; G10L 2015/225; G10L 21/10; G10L 15/183; G10L 15/197; G10L 17/06; G10L 2015/025; G10L 21/0364; G10L 25/63; G10L 25/78; G10L 25/84; G10L 15/06;
(Continued)

(56) References Cited

U.S. PATENT DOCUMENTS 11,676,220 B2 * 6/2023 Natarajan ........... G06F 16/3329
707/771
2024/0202539 A1 * 6/2024 Poirier .................... G06F 40/20
(Continued)

OTHER PUBLICATIONS

Koh et al. "Grounding Language Models to Images for Multimodal Inputs and Outputs" (Proceedings of the 40 th International Conference on Machine Learning, Honolulu, Hawaii, USA. PMLR 202, 2023). (Year: 2023).*
(Continued)

*Primary Examiner* — Abdelali Serrou
(74) *Attorney, Agent, or Firm* — Volpe Koenig

(57) ABSTRACT

An agentic extraction method is provided. The agentic extraction method is implemented by artificial intelligence (AI) agents to generate and provide a context grounding for an AI model. The agentic extraction method includes extracting text data from documents including complex document structures and capturing images of the documents. The agentic extraction method includes performing a multistage processing of the text data and the images utilizing large language models to generate an output set including a contextualization and one or more keywords. The agentic extraction method includes converting the output set to vectors including context embeddings to provide the context grounding.

19 Claims, 18 Drawing Sheets

(58) Field of Classification Search
CPC ......... G10L 15/07; G10L 17/04; G10L 19/00; G10L 2021/02082; G10L 25/72; G10L 25/87; G10L 13/027; G10L 15/10; G10L 15/16; G10L 15/187; G10L 15/222; G10L 15/285; G10L 17/08; G10L 17/24; G10L 19/167; G10L 19/26; G10L 2015/226; G10L 2021/02166; G10L 21/0232; G10L 25/54; G10L 13/04; G10L 15/04; G10L 15/05; G10L 15/32; G10L 19/24; G10L 2015/0631; G10L 2015/227; G10L 2021/02087; G10L 21/0216; G10L 21/0272; G10L 21/0308; G10L 25/03
See application file for complete search history.

(56) References Cited

U.S. PATENT DOCUMENTS

| | | | | |
|---|---|---|---|---|
| 2024/0338248 | A1* | 10/2024 | Bose | G06F 9/451 |
| 2024/0346255 | A1* | 10/2024 | Blohm | G06F 40/30 |
| 2024/0362422 | A1* | 10/2024 | Callegari | G06F 40/253 |
| 2024/0403338 | A1* | 12/2024 | Madisetti | G06F 40/30 |
| 2024/0427999 | A1* | 12/2024 | Newman | G06F 16/955 |
| 2024/0428494 | A1* | 12/2024 | Kumar | H04N 19/124 |
| 2025/0094474 | A1* | 3/2025 | Siebel | G06F 40/40 |

OTHER PUBLICATIONS

Peng et al. "Grounding Multimodal Large Language Models To the World", (2Microsoft Research, published as a conference paper at ICLR 2024) (Year: 2024).*
Youness, "A set of re-usable AI agent for document processing," https://github.com/CVxTz/document_ai_agents?tab=readme-ov-file, retrieved Dec. 27, 2024 (3 pages).
Djaja, "Create a RAG Agent with LangGraph to Extract the information from a PDF file," Medium, Sep. 23, 2024 (19 pages).
Majumder, "Building a Document-Savvy AI Agent: A Pinecone and OpenAI Love Story with a Sprinkle of ReactJS," Medium, Nov. 19, 2024 (32 pages).
UiPath Documentation: Automation Cloud Admin Guide, https://docs.uipath.com/automation-cloud/automation-cloud/latest/admin-guide/about-context-grounding, retreived Dec. 27, 2024 (1 page).
Arsanjani, "The Anatomy of Agentic AI," International Institute for Analytics, Medium, https://iianalytics.com/community/blog/the-anatomy-of-agentic-ai, Sep. 16, 2024 (7 pages).
"5 Best AI Text Extraction Tools for Document Management," https://blog.getodin.ai/, Dec. 10, 2024 (13 pages).
"Agentic Chunking: Enhancing RAG Answers for Completeness and Accuracy," Gleen, https://gleen.ai.blog/agentic-chunking-enhancing-rag-answers-for-completeness-and-accuracy/, retrieved Dec. 27, 2024 (10 pages).
McGrath, "AI Agents: a Comprehensive Guide," bitovi, https://www.bitovi.com/blog/ai-agents-a-comprehensive-guide, Oct. 18, 2024 (23 pages).

* cited by examiner

ADVANCED AGENTIC EXTRACTION FOR CONTEXT GROUNDING WITHIN AUTOMATIONS

FIELD

The disclosure herein generally relates to automation, and more specifically, to advanced agentic extraction and searching for context grounding within automations.

BACKGROUND

Generally, conventional software automations perform elementary repetitive human computer tasks. In performing elementary repetitive human computer tasks, conventional software automations statically execute hundreds (100s) of actions across large swaths of processing and memory resources.

For example, a conventional software automation may be required to analyze data of multiple databases containing unique industry terminology and complex document structures to retrieve information pertinent to a human computer task. In this regard, the conventional software automation commandeers access to the databases and requisitions processing power to analyze the data to determine pertinence. In most cases the industry terminology and complex document structures pose challenges to accessing and analyzing the data because the conventional software automation is not capable of deciphering the pertinence from the industry terminology and the complex document structures. Further, any retrieved data is passed to a model that performs a final processing to provide a response for the human computer task. Yet, because the model does not innately know about the pertinence, the response can take extremely long to generate, let alone be wildly off topic.

Additionally, conventional software automations utilize large language models (LLMs) when performing elementary repetitive human computer tasks. A problem with LLMs is that LLMs seem to only work well for general purpose (using well known keywords) and become wildly inaccurate when the elementary repetitive human computer tasks turn into complex business processes with specific goals. In other words, life is not about general purposes, and business applications reflect this notion in that complex business processes are unique, or have some level of uniqueness. Returning to the industry terminology and complex document structures, different terminology and structures pose challenges to LLMs and functionality thereof.

What is needed is a mechanism or a method that improves conventional software automations by tying automation to pertinence. Said another way, an improved and/or alternative approach for precise chunking of complex document structure and enhanced extraction and search techniques of industry terminology may be beneficial in ensuring relevant information is passed to models without noise and responses are tailored to diverse industries and applications. Further, an improved and/or alternative storage approach for semantically mapping what was actually meant by a query, an action, or a task to facilitate correlations within the enhanced extraction and search techniques.

SUMMARY

Certain embodiments herein may provide alternatives or solutions to the problems and needs in the art that have not yet been fully identified, appreciated, or solved by current conventional software automation technologies and/or provide a useful alternative thereto. For example, one or more embodiments herein pertain to advanced agentic extraction and searching for context grounding within automations.

According to one or more embodiments, an agentic extraction method is provided. The agentic extraction method is implemented by one or more artificial intelligence (AI) agents to generate and provide a context grounding for an AI model. The agentic extraction method includes extracting text data from one or more documents including complex document structures and capturing one or more images of the one or more documents. The agentic extraction method includes performing a multistage processing of the text data and the one or more images utilizing two or more large language models to generate an output set including a contextualization and one or more keywords. The agentic extraction method includes converting the output set to one or more vectors including context embeddings to provide the context grounding.

According to one or more embodiments, an agentic searching method is provided. The agentic searching method is implemented by one or more artificial intelligence (AI) agents. The agentic searching method includes performing advanced agentic searching of a semantic storage in response to a complex query. The agentic searching method includes outputting the context grounding to an AI model with the complex query to enhance an accuracy of a response of the AI model. The agentic searching method includes receiving the response to the complex query from the AI model.

According to one or more embodiments, an agentic memory method is provided. The agentic memory method is implemented by one or more artificial intelligence (AI) agents. The agentic memory method includes storing one or more vectors including context embeddings generated by advanced agentic extraction in response to one or more queries in an agentic memory. The agentic memory method includes receiving and matching a complex query to the one or more vectors of the agentic memory by an advanced agentic search to determine a context grounding. The agentic memory method includes providing the context grounding to an AI model with the complex query to enhance an accuracy of a response of the AI model and receiving the response to the complex query from the AI model.

Any of the methods herein can be implemented as a computer program product, a system, a device, and/or an apparatus.

BRIEF DESCRIPTION OF THE DRAWINGS

In order that the advantages of certain embodiments will be readily understood, a more particular description briefly described above will be rendered by reference to specific embodiments that are illustrated in the appended drawings. While it should be understood that these drawings depict only typical embodiments and are not therefore to be considered to be limiting of its scope, the disclosure herein is described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

One or more embodiments herein pertain to agentic memory. More particularly, the agentic memory can be used for storing context grounding, as well as caching other results, for automations.

According to one or more embodiments, enhanced extraction and search techniques are provided and tailored to diverse industries and applications (e.g., tailored to the unique industry terminology and complex document structures) that improves model responses. More particularly, the advanced agentic extraction and search techniques provide the context grounding used within automations to improve models, such as large language models (LLMs), by integrating enterprise-specific information with pretrained knowledge, enabling accurate responses to specialized or recent queries.

By way of example, in context grounding, a query is submitted through a prompt to run on any LLM in the cloud (e.g., owed by the user or third party). Yet, the LLM does not have any context because the LLM indicates that it can access only data before a certain date (i.e., the LLM is missing for the current calendar year and the query is submitted in August). How does the LLM get the context needed to respond to the query? How is additional context provided to the LLM? Embodiments of the advanced agentic extraction and searching herein feed the needed context into the LLM by doing a search on the side and providing results of the search into the prompt as if submitted with the query. Accordingly, the query, the LLM, and the response are grounded in context that otherwise was not available in the data.

According to one or more embodiments, agentic memory can be provided as a long-term memory for automations. In this regard, the agentic memory can be used for storing the context grounding generated by the enhanced extraction and search techniques, as well as caching other results produced by automations across a system. In this way, agentic memory can solve the shortcomings of LLMs by providing an improved and alternative storage approach for semantically mapping context grounding and other results for use by automations across a system.

Figure 1:
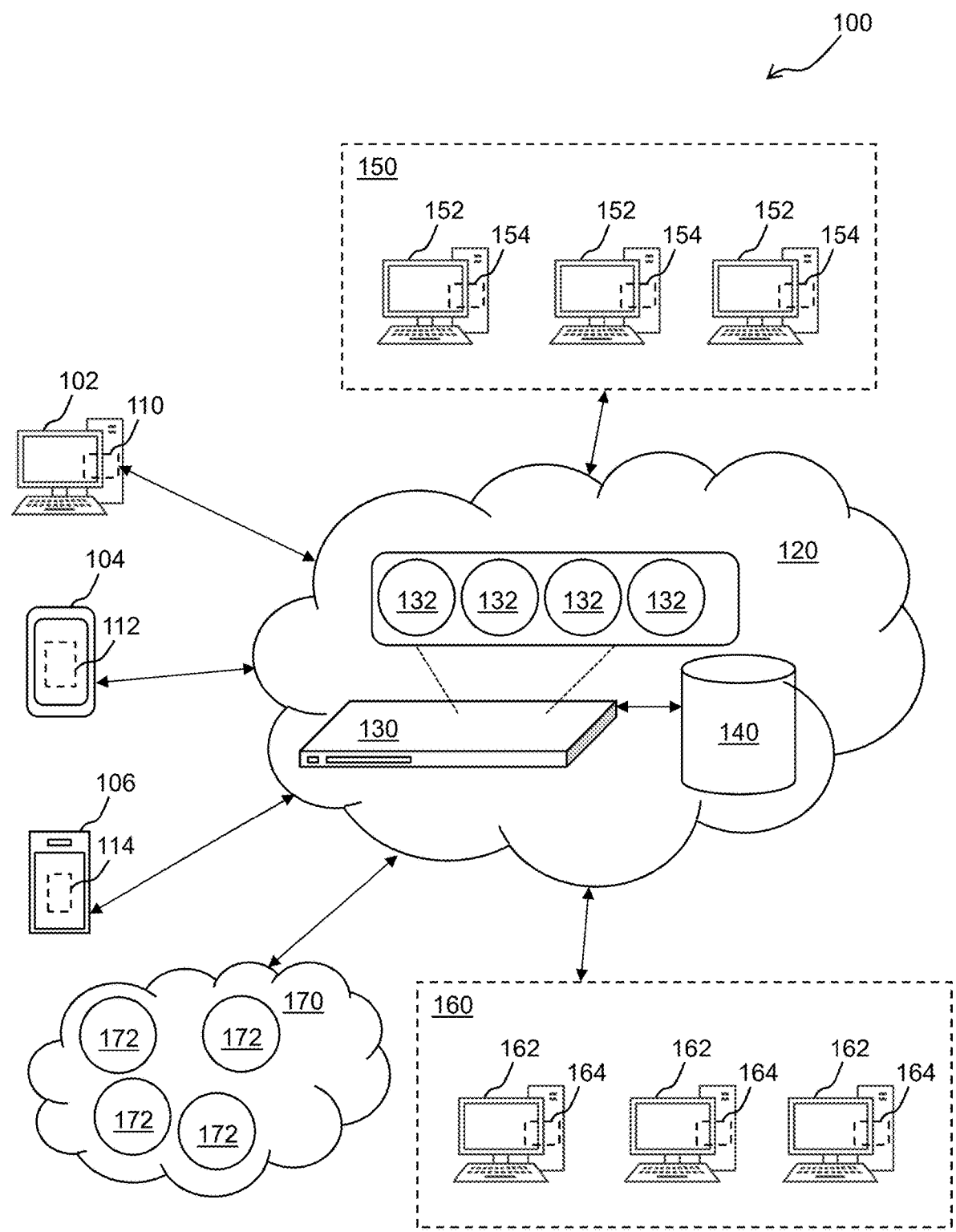
FIG. 1 is an architectural diagram illustrating a hyperautomation system configured to perform agentic automation and orchestration according to one or more embodiments.

FIG. 1 is an architectural diagram illustrating a hyper-automation system 100 configured to perform agentic automation and orchestration, according to one or more embodiments. "Hyper-automation," as used herein, refers to automation systems that bring together components of process automation, agentic automation, integration tools, and technologies that amplify the ability to automate work. Examples of the components include, but are not limited to, artificial intelligence (AI) agents, agentic orchestration processes (AOPs), and robotic process automation (RPA) robots.

Generally, as used herein, "AI agents" are AI-enhanced probabilistic automations that act independently, act dynamically, make decisions, execute actions, and act adaptively. In some instances, the AI agents operate accordingly due to their use of large language models (LLMs) or other AI models, which are typically probabilistic in nature themselves. According to one or more embodiments, and as described herein, the one or more AI agents can implement context grounding techniques (e.g., retrieval-augmented generation (RAG), extraction, and semantic storage), advanced agentic searching (semantic search and retrieval, hybrid search, and broad search with re-ranking), tethering (including automatic tethering) and query decomposition.

Generally, as used herein, "AOPs" are automations that combine probabilistic and deterministic methods to be both dynamic and predictable. In some instances, AOPs are automations that allow users to describe overall business processes. A user is, but not limited to, any person accessing a system executing an automation (e.g., a developer, an engineer, a customer, etc.). AOPs may be created using an interface that allows the creation of business flowcharts that are described in Business Process Model and Notation (BPMN), which is an Extensible Markup Language (XML) description of the business process (see FIG. 5 for example).

Generally, as used herein, "RPA robots" are rules-based deterministic automations that act predictably and make deterministic decisions.

For instance, one or more RPAs may be used at the core of a hyper-automation system in some embodiments, and in certain embodiments, automation capabilities may be expanded with AI/machine learning (ML), process mining, analytics, agentic automation, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

In such embodiments, AI agents "coexist" in tandem with RPA robots that execute RPAs and AOPs. As noted herein, AI agents are automations, enhanced with AI skills, that can act independently and dynamically make decisions, execute actions, and adapt their performance. The AI agents can dynamically leverage the tools available via these RPA robots to perform document processing (see, for example, U.S. Patent Application Publication No. 2021/0097274), user interface (UI) automation (see, for example, U.S. Pat. Nos. 10,654,166, 10,990,876, 11,080,548, 11,507,259, 11,733,668, and 11,748,069), semantic copy-and-paste between a source and a target (see, for example, U.S. Pat. No. 12,124,806 and U.S. Patent Application Publication Nos. 2023/0107316, 2023/0415338, and 2024/0220581), etc. AI agents can dynamically select these tools and execute them in the form of a pipeline.

Generally, agentic automation is a probabilistic automation performed by one or more AI agents. Agentic automation expands the automation potential of organizations by placing focus not just on individual tasks, but on entire end-to-end processes. Teams of RPA robots and/or AOPs, directed by AI agents, may enable a single employee to achieve the work of many. Agentic automation, via AI agents and/or AOPs, gives managers the space to mentor, doctors more time to care for patients, developers the ability to fine-tune their work, engineers the freedom to innovate, and customers seamless and personalized experiences.

Various technical effects, benefits, and advantages may be achieved via agentic automation. Agentic automation improves memory usage by requiring less storage for data and increases processor efficiency by reducing the number of calls and actions. Agentic automation also potentially provides the ability to process gigabytes, terabytes, petabytes, or more, of data that would not be possible by human-implemented processes, whether mental or by hand. Agentic automation also potentially enables fewer triggers and models to be used via dynamic decision making. Whereas conventional software automations alone may require one hundred (100) actions in an example scenario, agentic automation in the same example scenario may be reduced the required actions substantially (e.g., to fifteen (15) actions). Agentic automation may also employ context grounding to tether the AI agent to a desired context that "constrains" the LLM or AI Model to a pertinent context, thereby improving the efficiency of the LLM or AI Model.

AI agents may have agentic memory that evolves and remembers user interactions, feedback, corrections, and solutions (e.g., dynamic and/or direct user inputs from human-in-the-loop operations). As used herein, human-in-the-loop operations or "human-in-the-loop" can include AI agents and RPA robots working cooperatively with users to receive the dynamic and/or direct user inputs. As the agentic memory grows, the AI agent can become increasingly autonomous, reducing the need for dynamic and/or direct user inputs and improving efficiency. AI agents may also learn to be more efficient based on the agentic memory if more efficient solutions are contained therein or derived therefrom. For instance, AI agents may periodically process the agentic memory to analyze patterns to achieve greater autonomy.

As used herein, "agentic memory" is a dynamic caching (i.e., storing) system for managing escalations and tool calls. By way of example operation, when the AI agent encounters a problem while running, the AI agent can prompt or otherwise request from a user interaction(s) or feedback about overcoming the problem, store/cache the interaction(s) or feedback, and learn from this interaction or feedback to reduce the need for repeated user input. According to one or more technical effects, benefits, and advantages, agentic memory provides enhanced efficiency by storing solutions to common problems and minimizing potentially costly tool calls. The cooperative operations of the AI agents and the agentic memory potentially "bend the curve" so user interaction is required less and less as the AI agent continually learns via the agentic memory.

Generally, agentic orchestration is implemented by a conductor application to implement one or more AOPs and/or AI agents to orchestrate AI agents (e.g., UiPath Agents™), third-party agents, RPA robots (e.g., UiPath Robots™), AOPs, and users (e.g., if user interaction is required or requested) executing a workflow. Agentic orchestration enables the agentic automation, modeling, and monitoring of complex business processes from start to finish. Agentic orchestration also provides the unique ability to orchestrate RPA robots, AI agents, AOPs, third party agents, and users across end-to-end workflows. Agentic orchestration is beneficial for the successful scaling of agentic automations.

AI agents for agentic automation are AI model-based, as discussed here, enabling the AI agents to work independently of users and implement these agentic automations. AI agents are also goal-oriented, using context to make probabilistic decisions. Further, AI agents are well-suited for ad hoc tasks that require high adaptability. AI agents learn how work is done and improve over time. AI agents can use and choose various tools for accomplishing tasks, gathering context, and taking actions (often through RPA robots used by the AI agents as tools). In some embodiments, AI agents can build workflows and generate automations for RPA robots and/or other AI agents to execute, such as by leveraging UiPath Autopilot™ for developers or another application that helps developers expedite the creation and testing of agentic automations. For instance, AI agents may utilize the designer application via an API to generate another AI agent or an RPA robot to execute a portion of a workflow, as well as trigger human-in-the-loop operations to escalate issues with the workflow. If correct, the workflow may then the AI agents can be deployed. AI agents may also have varying degrees of autonomy, which is governed by the agentic orchestration.

The AI agent, by executing an "agentic loop," generates a dynamic plan to achieve goals per instructions using the provided tools and context. Once the dynamic plan is generated, the AI agent utilizes an efficient execution path for the dynamic plan. If the dynamic plan has two or more steps that can be executed in parallel, the AI agent executes the two or more steps in parallel based on the available resources. After each step is completed, the AI agent retrieves the output from the step and regenerates the next step or steps. Thus, the agentic loop continues until the goals are achieved. Executing the steps of the dynamic plan in parallel and using the ecosystem tools and context grounding are advanced capabilities for the agentic orchestration.

As noted herein, RPA robots are rules-based automations that act predictably and make deterministic decisions. RPA robots are highly reliable, efficient, and well-suited for routine tasks. RPA robots, along with AI agents, may use human-in-the-loop operations for exception management. According to one or more embodiments, AI agents are more flexible, more abstract, and more self-willed than RPA robots and AOPs. Further, RPA robots are more stable, more concrete, and more governable than AI agents and AOPs. Furthermore, AOPs processes range between the respective flexibility/stability, abstract/concrete, and self-willed/governable qualities of AI agents and RPA robots.

Figure 3:
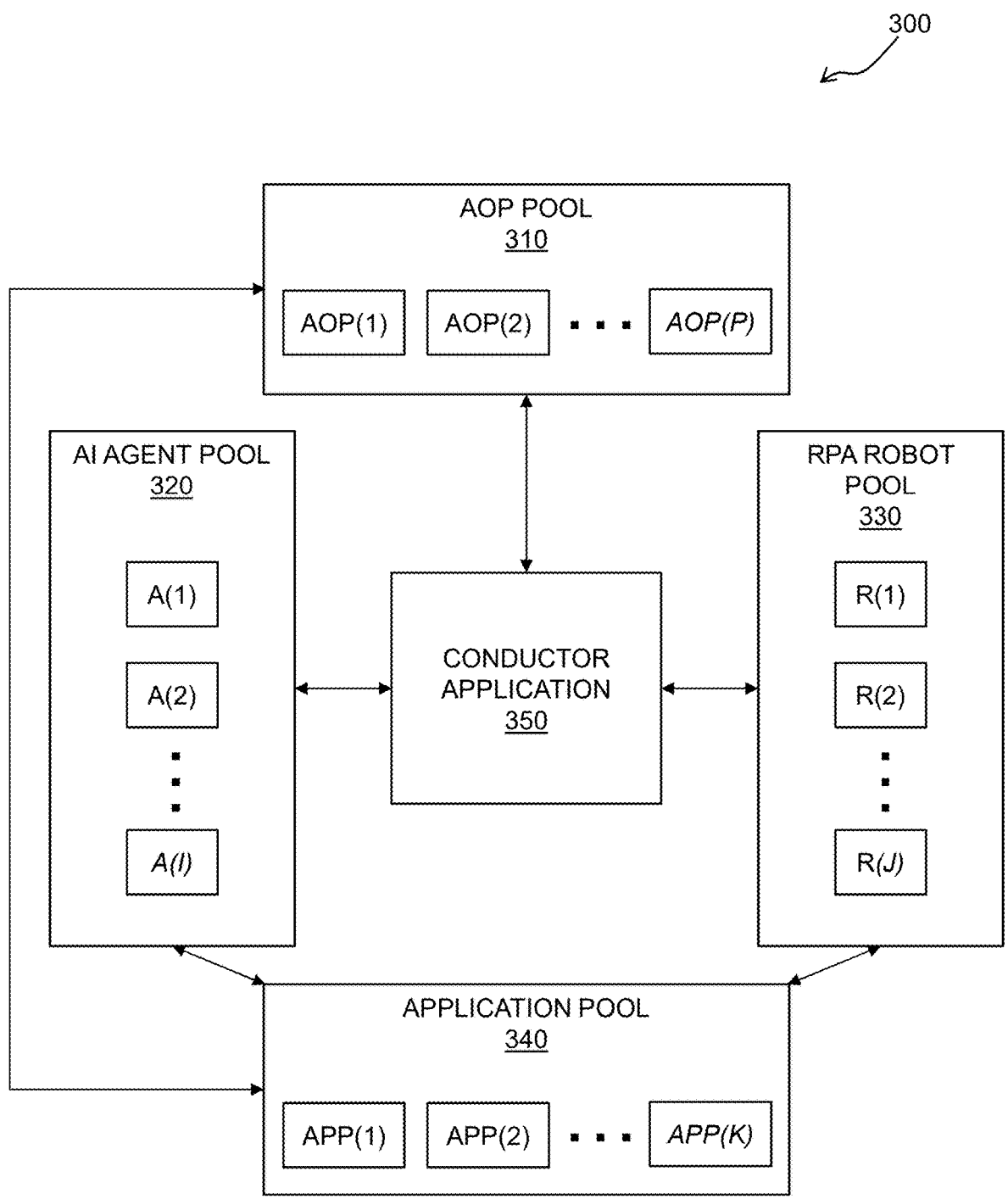
FIG. 3 illustrates pools of AI agents, RPA robots, agentic orchestration processes (AOPs), and applications according to one or more embodiments.

As described further herein with respect to FIG. 3, AI agents, AOPs, and RPA robots can potentially find and use one another as tools to accomplish a task. AI agents, AOPs, and RPA robots may also be able to access and use various applications (e.g., via application programming interfaces (APIs)). Tools may be manually configured for an automation by a developer and/or the AI agents and RPA robots may discover and use tools at runtime.

According to some embodiments, AI agents, AOPs, and RPA robots may work cooperatively with users (e.g., human-in-the-loop), enabling AI agents, AOPs, and RPA robots to make faster, more consistent, and more informed decisions. Further the use of AI agents, AOPs, and RPA robots enables users to accomplish more, as AI agents, AOPs, and RPA robots may take on additional repetitive, mundane, and ad hoc tasks at a scale that is not possible for humans to operate. Users may make the decisions when AI agents, AOPs, or RPA robots encounter an exception. Users may thus be elevated to, and focused on, being supervisors, decision makers, and organizational leaders.

AI models provide AI agents with the ability to reason, plan, create, and make autonomous decisions. AI models can also be used by RPA robots for task-specific activities, such as processing a document or analyzing data. AI models may be enhanced with business-specific content and context (e.g., from a collection of context repositories for an enterprise), improving accuracy and results of the AI models. AI models can be applied individually or concurrently, depending on the complexity of the task. AI model selection can come from the RPA vendor's model library, third-party models, and bring-your-own-model (BYOM) options (see, for example, U.S. Pat. No. 11,738,453 and 11,748,479).

Hyper-automation system 100 includes user computing systems, such as desktop computer 102, tablet 104, and smart phone 106. However, any desired user computing system may be used without deviating from the scope of the disclosure including, but not limited to, smart watches, laptop computers, servers, Internet-of-Things (IoT) devices, etc. Also, while three user computing systems are shown in FIG. 1, any suitable number of user computing systems may be used without deviating from the scope of the disclosure. For instance, in some embodiments, dozens, hundreds, thousands, or millions of user computing systems may be used. The user computing systems may be actively used by a user or run automatically, by AI agents, AOPs, and/or RPA robots, without much or any user input.

As disclosed herein, there are three types of automations in some embodiments: (1) agentic automations that are implemented by respective AI agents; (2) RPAs that are implemented by respective RPA robots; and (3) composite automations that are achieved by a combination of AI agent(s) and RPA robot(s) to accomplish a more complex overall task. Automations 110, 112, 114 may include, but are not limited to, those executed by RPA robots and/or AI agents, whether individually or to achieve a larger composite automation. Other processes may also be implemented, such as listeners. These processes may be standalone applications, subprocesses of another application, part of an operating system, any other suitable software and/or hardware, or any combination of these without deviating from the scope of the disclosure. Indeed, in some embodiments, the logic of the process(es) is implemented partially or completely via physical hardware.

Each user computing system 102, 104, 106 has respective automations 110, 112, 114 running thereon, such as those implemented by RPA robots, AI agents, AOPs, etc. In some embodiments, automations 110, 112, 114 can be stored remotely (e.g., on server 130 or in database 140 and accessed via network 120) and loaded by RPA robots and/or AI agents to implement automations 110, 112, 114. Database 140 may store structured and/or unstructured data, although the former is typically required for RPAs. RPA automations may exist as a script (e.g., Extensible Markup Language (XML), Extensible Application Markup Language (XAML), etc.) or be compiled into machine readable code (e.g., as a digital link library). In the case of AI agents, agentic automations may be generated based on plain text descriptions of a desired goal, for example.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

In the case of automations 110, 112, 114 being RPAs, automations 110, 112, 114 may execute the logic developed in workflows during design time. The workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human-in-the-loop, and long-running transactions in unattended environments. See, for example, U.S. Pat. No. 10,860,905, which is hereby incorporated by reference in its entirety. Human-in-the-loop comes into play when certain processes require user inputs (e.g., dynamic and/or direct user inputs) to handle exceptions, approvals, or validation before proceeding to the next step in the activity. In this situation, the process execution is suspended, freeing up the RPA robots until the human-in-the-loop portion of the task is completed.

A long-running workflow may support workflow fragmentation via persistence activities and may be combined with invoke process and non-user interaction activities, orchestrating human-in-the-loop operations with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing API calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of the automations 110, 112, 114 are in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of the automations 110, 112, 114 may call one or more AI/ML models 132 deployed on or accessible by core hyper-automation system 120 and trained to accomplish various tasks. For instance, AI/ML models 132 may include models trained to look for various application versions, perform computer vision (CV), perform optical character recognition (OCR), generate user interface (UI) descriptors, offer suggestions for next activities or sequences of activities in workflows, perform semantic matching, perform natural language processing (NLP), generate or modify code and/or workflows, etc. AI/ML models may be trained using labeled data that includes, but is not limited to, elements from data sources (e.g., web pages, forms, scanned documents, application interfaces, screens, etc.), previously created workflows, screenshots of various application screens for various versions with their corresponding UI elements, libraries of UI objects, etc. AI/ML models 132 may be trained to achieve a desired confidence threshold while not being overfit to a given set of training data. Generally, UI elements, UI descriptors, applications, and application screens can be considered to be UI objects.

AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with CV, OCR, document processing and/or understanding, semantic learning and/or analysis, analytical predictions, process discovery, task mining, testing, automatic workflow generation, sequence extraction, clustering detection, audio-to-text translation, NLP, semantic matching, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of the computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by RPA robots, AOPs, or AI agents, for example, in some embodiments, and may provide any of the functionality described herein. By way of example, RPA robots can include attended robots, unattended robots, and/or test robots. Attended robots work with users to assist with tasks (e.g., via UiPath Assistant™). Unattended robots work independently of users and may run in the background, potentially without user knowledge. Test robots run test cases against applications or workflows. Test robots may be run on multiple computing systems in parallel in some embodiments.

The discovery functionality may discover and provide automatic recommendations for different opportunities for automation of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., XAML process data) may be exported to process documents or to a designer application such as UiPath Studio™ to create and deploy automations more rapidly. Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Studio Web™). For instance, developers of an RPA development facility 150 may use designer applications 154 of computing systems 152 to build and test agentic automations, RPAs, AOPs, and/or composite automations for various applications and environments, such as web, mobile, SAP®, and virtualized desktops. Developers may also build AOPs. For instance, developers may create automations to be executed by RPA robots, AI agents, AOPs, a combination thereof, etc. API integration may be provided for various applications, technologies, and platforms. Predefined activities, drag-and-drop modeling, and a workflow recorder, may make automation easier with minimal coding. Document understanding functionality may be provided via drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

Designer application 152 may be designed to call one or more of trained AI/ML models 132 on server 130 and/or generative AI models 172 in a cloud environment via network 120 (e.g., a local area network (LAN), a mobile communications network, a satellite communications network, the Internet, any combination thereof, etc.) to assist with the automation development process. In some embodiments, one or more of the AI/ML models may be packaged with designer application 152 or otherwise stored locally on computing system 150.

In some embodiments, the designer application 152 and one or more of AI/ML models 132 may be configured to use an object repository stored in database 140. See, for example, U.S. Pat. No. 11,748,069, which is hereby incorporated by reference in its entirety. Generally, the object repository is a storage mechanism used by automations for images, text, semantic data, taxonomical associations, ontological associations, UI objects, etc. For example, the object repository may include libraries of UI objects that can be used to develop workflows via the designer application 152. The object repository may be used to add UI descriptors to activities in the workflows of the designer application 152 for UI automations. In some embodiments, one or more of the AI/ML models 132 may generate new UI descriptors and add them to the object repository in database 140.

Once automations are completed in the designer application 152, they may be published on the server 130, pushed out to the computing systems 102, 104, 106, etc. For example, as new UI descriptors are created and/or existing UI descriptors are modified, a global repository of UI object libraries may be built that is sharable and collaborative for all automations. Regarding object repositories, taxonomies and ontologies may be used. A taxonomy is a hierarchical structure of subcategories. An ontology is a formal representation of a domain of knowledge, including concepts, properties, and relationships therebetween. In an ontology, the relationships between categories are not necessarily hierarchical, and the ontological relationship may span multiple screens of an application.

An integration service may allow developers to seamlessly combine UI automation with API automation, for example. Automations, such as any of the types described herein, may be built that require APIs or traverse both API and non-API applications and systems. A repository (e.g., UiPath Object Repository™) or marketplace (e.g., UiPath Marketplace™) for pre-built automation templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots, AOPs, and AI agents in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots, AOPs, and/or AI agents) capable of taking actions that may harm the organization, such as violating the E.U. General Data Protection Regulation (GDPR), the U.S.

Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into the automation process development pipeline in some embodiments by preventing developers from taking dependencies on unapproved software libraries that may either introduce security risks or work in a way that violates policies, regulations, privacy laws, and/or privacy policies. See, for example, U.S. Pat. No. 11,733,668, which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, AOPs, and/or AI agents, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robots, AOPs, and/or AI agent deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots, AOPs, and AI agents) may call AI/ML models from the AI center, such as AI/ML models 132. Performance of the AI/ML models may be monitored and be trained and improved using user-validated data, such as that provided by data review center 160. Users, as reviewers, may provide labeled data to core hyper-automation system 120 via a review application 152 on computing systems 154.

For instance, reviewers may validate that predictions by AI/ML models 132 and/or generative AI models 172 are accurate or provide corrections otherwise. Users, as reviewers, may also provide dynamic and/or direct user inputs (e.g., within the scope of human-in-the-loop operations) to AI agents, and the dynamic and/or direct user inputs (e.g., responses and corrections provided by the reviewers) may be used to train LLM(s) used by AI agents to be more accurate. In other words, the dynamic and/or direct user inputs may be saved as training data for retraining AI/ML models 132 and/or generative AI models 172 and may be stored in a database such as database 140, for example. The AI center may then schedule and execute training jobs to train the new versions of the AI/ML models using the training data. Both positive and negative examples may be stored and used for retraining of AI/ML models 132 and/or generative AI models 172.

The engagement functionality engages automations and users as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to users, and vice versa. Users may provide approvals or escalations, make exceptions, etc. The automation may then perform the automatic functionality of a given workflow.

A local assistant may be provided as a launchpad for users to launch automations (e.g., UiPath Autopilot™). Such an assistant may also provide semantic cut-and-paste functionality (e.g., UiPath Clipboard AI™). See, for example, U.S. Pat. No. 12,124,806 and U.S. Patent Application Publication Nos. 2023/0107316, 2023/0415338, and 2024/0220581. This functionality may be provided in a tray provided by an operating system, for example, and may allow users to interact with RPA robots, AOPs, and AI agents and automation-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

In some embodiments, per the above, generative AI models 172 are used. For instance, AI agents make use of generative AI models. Generative AI models 172 can generate various types of content, such as text, imagery, audio, and synthetic data. Various types of generative AI models may be used, including, but not limited to, LLMs, generative adversarial networks (GANs), diffusion models, flow-based models, variational autoencoders (VAEs), transformers, etc. In the case of LLMs, for example, NLP models such as word2vec, BERT, GPT-3, ChatGPT, etc. may be used in some embodiments to facilitate semantic understanding and provide more accurate and human-like answers. These models may be part of AI/ML models 132 hosted on server 130. For instance, the generative AI models 172 may be trained on a large corpus of textual information to perform semantic understanding, to understand the nature of what is present on a screen from text, to automatically generate code, and the like. AI agents may use such generative AI models 172. In certain embodiments, generative AI models 172 provided by an existing cloud ML service provider, such as OpenAIR, Google®, Amazon®, Microsoft®, IBM®, Nvidia®, Meta®, etc., may be employed and trained to provide such functionality. In generative AI embodiments where generative AI model(s) 172 are remotely hosted, server 130 can be configured to integrate with third-party APIs, which allow server 130 to send a request to generative AI model(s) 172 including the requisite input information and receive a response in return (e.g., the semantic matches of fields between application versions, a classification of the type of the application on the screen, responses to natural language queries from users, etc.). Such embodiments may provide a more advanced and sophisticated user experience, as well as provide access to state-of-the-art NLP and other ML capabilities that these companies offer.

One aspect of generative AI models 172 in some embodiments is the use of transfer learning. In transfer learning, a pretrained generative AI mode, such as an LLM, is fine-tuned on a specific task or domain. This allows the LLM to leverage the knowledge already learned during its initial training and adapt it to a specific application. In the case of LLMs, the pretraining phase involves training an LLM on a large corpus of text, typically consisting of billions of words. During this phase, the LLM learns the relationships between words and phrases, which enables the LLM to generate coherent and human-like responses to text-based inputs. The output of this pretraining phase is an LLM that has a high level of understanding of the underlying patterns in natural language.

In the fine-tuning phase, the pretrained LLM is adapted to a specific task or domain by training the LLM on a smaller dataset that is specific to the task. For instance, in some embodiments, the LLM may be trained to analyze a certain type or multiple types of data sources to improve its accuracy with respect to their content. This data may include, but is not limited to, prompt tuning or instruction tuning, where the model is specifically trained to better understand and follow certain types of instructions or prompts, improving its ability to perform specific tasks when given appropriate instructions. Such information may be provided as part of the training data, and the LLM may learn to focus on these areas and more accurately identify data elements therein. Fine-tuning allows the LLM to learn the nuances of the task or domain, such as the specific vocabulary and syntax used in that domain, without requiring as much data as would be necessary to train an LLM from scratch. By leveraging the knowledge learned in the pretraining phase, the fine-tuned LLM can achieve state-of-the-art performance on specific tasks with a relatively small amount of training data.

LLMs may use a vector database. Vector databases index, store, and provide access to structured or unstructured data (e.g., text, images, time series data, etc.) alongside the vector embeddings thereof. Data such as text may be tokenized, where single letters, words, or sequences of words are parsed from the text into tokens. These tokens are then "embedded" into vector embeddings, which are the numerical representations of this data. Vector databases enable LLMs to find and retrieve similar objects quickly and at scale in production environments, which is not possible via manual processes.

AI and ML allow unstructured data to be numerically represented without losing the semantic meaning thereof in vector embeddings. A vector embedding is a long list of numbers, each describing a feature of the data object that the vector embedding represents. Similar objects are grouped together in the vector space. In other words, the more similar the objects are, the closer that the vector embeddings representing the objects will be to one another. Similar objects may be found using a vector search, similarity search, or semantic search and retrieval. The distance between the vector embeddings may be calculated using various techniques including, but not limited to, squared Euclidean or L2-squared distance, Manhattan or L1 distance, cosine similarity, dot product, Hamming distance, etc. It may be beneficial to select the same metric that is used to train the AI/ML model.

Vector indexing may be used to organize vector embeddings so data can be retrieved efficiently. Calculating the distance between a vector embedding and all other vector embeddings in the vector database using the k-Nearest Neighbors (kNN) algorithm can be computationally expensive if there are a large number of data points since the required calculations increase linearly (O(n)) with the dimensionality and the number of data points. It is more efficient to find similar objects using an approximate nearest neighbor (ANN) approach. The distances between the vector embeddings are pre-calculated, and similar vectors are organized and stored close to one another (e.g., in clusters or a graph) similar objects can be found faster. This process is called "vector indexing." ANN algorithms that may be used in some embodiments include, but are not limited to, clustering-based indexing, proximity graph-based indexing, tree-based indexing, hash-based indexing, compression-based indexing, etc.

Figure 2:
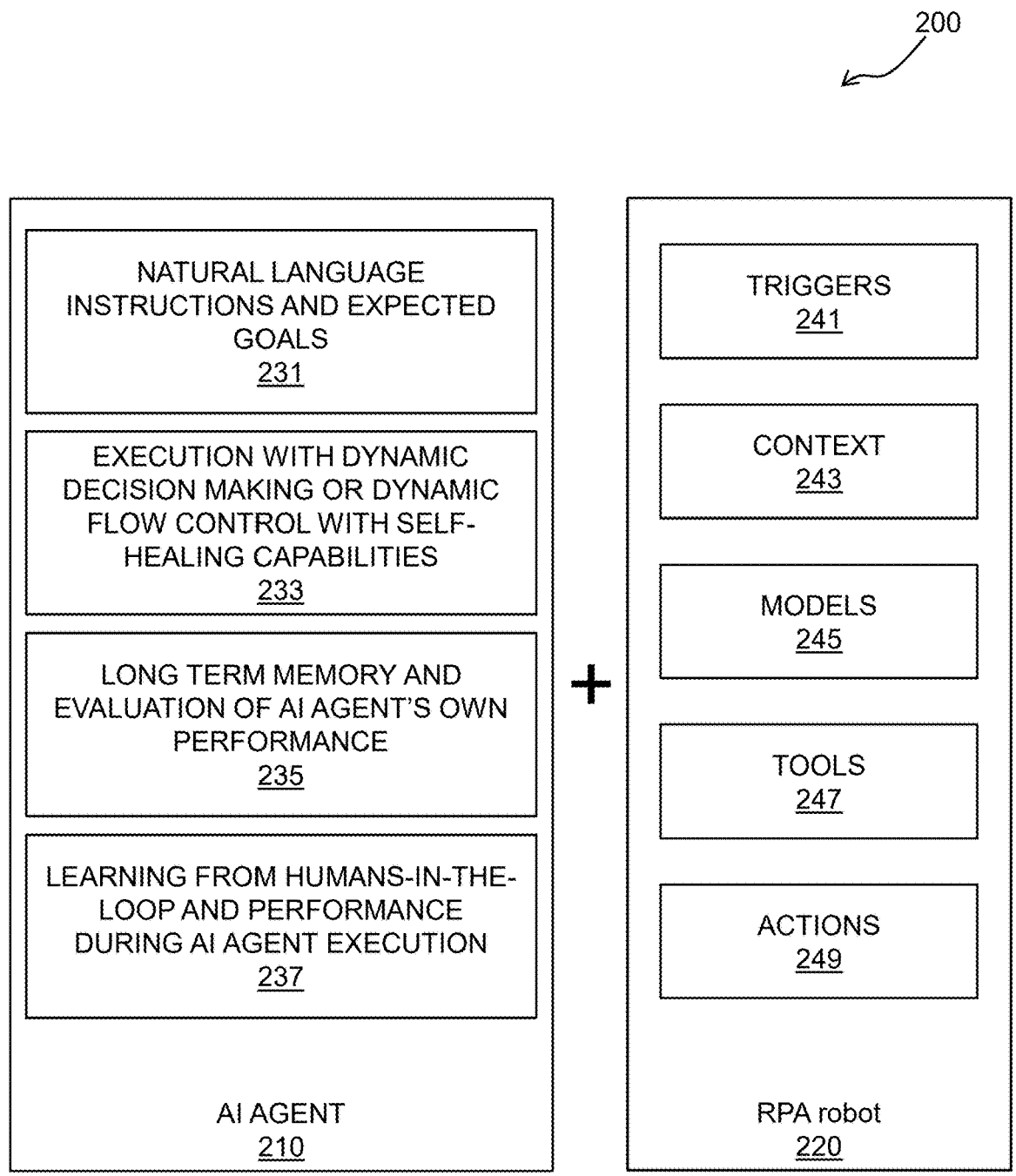
FIG. 2 illustrates some of the combined capabilities of an artificial intelligence (AI) agent and a robotic process automation (RPA) robot according to one or more embodiments.

FIG. 2 illustrates some of the combined capabilities 200 of an AI agent 210 and an RPA robot 220, according to one or more embodiments. AI agent 210 is configured to process natural language instructions and achieve expected goals 231 therefrom, execute with dynamic decision making or dynamic flow control with self-healing capabilities 233, store information in long term memory and evaluate its own execution performance 235, and learn from humans-in-theloop and self-performance during execution 237. RPA robot 220 can be leveraged by AI agent 210 to respond to triggers 241 (e.g., from a conductor application such as UiPath Orchestrator™), to respond based on context 243 (i.e., RPA robot 220 can retrieve information from the context to execute deterministic steps, such as updating a document based on the retrieved information from the context; alternatively, agent 210 can use the retrieved context to update a dynamic plan and execute the next steps complete the goals as per the instructions), to leverage models 245 (e.g., CV models, document processing models, speech-to-text models, OCR models, AI models, etc.), leverage tools 247 (e.g., utilize tools available in the RPA ecosystem, such as complete automations, workflows within automations, integration service connector calls for $3^{rd}$ party and $1^{st}$ party services, RPA designer application activities, LLM calls, automations, etc.), and perform actions 249 that an RPA robot 220 can take (i.e., use the RPA robot 220 as a tool) based on input from the AI agent 210. AI agent 210 can also take actions 249 to update its memory, update the plan to accomplish its goals per instructions, self-evaluate and learn from the actions, self-heal when it encounters roadblocks, and escalate to users when it needs help.

As discussed above, agentic automation achieves various technical effects, benefits, and advantages. Agentic automation improves memory usage by requiring less storage for data and increases processor efficiency by reducing the number of calls and actions. Agentic automation provides the ability to process gigabytes, terabytes, petabytes, or more, of data that would not be possible by human-implemented processes, whether mental or by hand. Agentic automation enables fewer triggers and models to be used via dynamic decision making. For instance, and as discussed herein, whereas conventional software automations alone may require one hundred (100) actions in an example scenario, agentic automation in the same example scenario may reduce the required actions substantially (e.g., to fifteen (15) actions). Agentic automation may also employ context grounding to tether the AI agent 210 to a desired context that "constrains" the LLM to a pertinent context, thereby improving the efficiency of the LLM.

As used herein, "context grounding" refers to a methodology to improve models, such as LLMs, by integrating enterprise-specific information with pretrained knowledge, enabling accurate responses to specialized or recent queries. In some embodiments, context grounding uses external data to augment the LLM response and get a response that the LLM does not know about innately and answer queries on top of the context provided. By way of example, because unique industry terminology and complex document structures can pose challenges in ensuring effective retrieval and semantic matching, context grounding solves challenges by providing precise chunking of documents to ensure relevant information (e.g., from the unique industry terminology and complex document structures) can be passed to an LLM without noise. By way of an additional example, context grounding provides enhanced extraction and search techniques tailored to diverse industries and applications (e.g., tailored to the unique industry terminology and complex document structures) that improves the LLM response.

FIG. 3 depicts a diagram 300 of AOPs, AI agents, RPA robots, and applications, according to one or more embodiments.

AOP pool 310 includes AOPs 1, 2, . . . , P that implement business processes. Per the above, the AOPs may be implemented as BPMN, which is executed by an AOP execution engine, such as Temporal®. AOPs can utilize AI agents and/or RPA robots to execute parts of the business process.

AI agent pool 320 includes AI agents 1, 2, . . . , I that have been trained to perform various tasks, such as investigating claims, seeking resolution with employees, summarizing policies and technical specifications, etc. RPA robot pool 330 includes RPA robots 1, 2, . . . J that execute various automations, such as UI automations, semantic matching automations, form filling automations, etc.

Application pool 340 includes applications 1, 2, . . . , K that the AI agents and/or RPA robots can interact with. For instance, the applications may include CRM applications, invoicing applications, payroll applications, banking applications, web applications, legacy system applications, word processing applications, spreadsheet applications, email applications, etc. The AI agents, RPA robots, and applications may be on a single computing system or on multiple or many computing systems. AOPs are typically in the cloud or otherwise server side, and may be on the same computing system(s) as conductor application 350 in some embodiments.

The AOPs can trigger or call the AI agents and RPA robots via conductor application 350. The AI agents and RPA robots can also trigger or call one another via conductor application. For instance, to call an RPA robot, the AI agent may make a "Start Job" call in conductor application 350. It should be noted that the RPA robots are deployed as automations that are controlled by conductor application 350. The AI agents, AOPs and RPA robots can also trigger or call certain applications. For instance, via information gleaned from human-in-the-loop operations, the AI agents may dynamically learn which RPA robots, other AI agents, and/or applications to trigger or call to achieve a task. For instance, an AI agent may learn to trigger an RPA robot via conductor application 350 to fill out and submit a web form. The AI agent may also learn to open Microsoft Excel® and enter the form information into appropriate tabs, open and update a payroll application, etc. The AI agent may further learn to call or trigger an email resolution AI agent via conductor application 350 that reaches out to a customer service representative of a bank if an issue occurs. The technical effects, benefits, and advantages may be similar to those discussed above with respect to FIGS. 1 and 2 in some embodiments.

In order for AI agents, AOPs, and RPA robots to find one another, the AI agents may belong to a tenant. The designer application may call the conductor to get the list of available RPAs. There are three ways for getting the capabilities of automations in some embodiments: (1) the user provides a description of what the automation does while creating the workflow in the designer application; (2) AI agents and ML techniques are used to generate a summary of what a given workflow does; or (3) the developer can describe what the automation does in the designer application. The conductor application may also have lists of what applications are available to given AI agents and RPA robots. In other words, descriptions of available AI agents, RPA robots, and/or applications are derived from or assigned by AI agents, ML techniques, or users.

Figure 4:
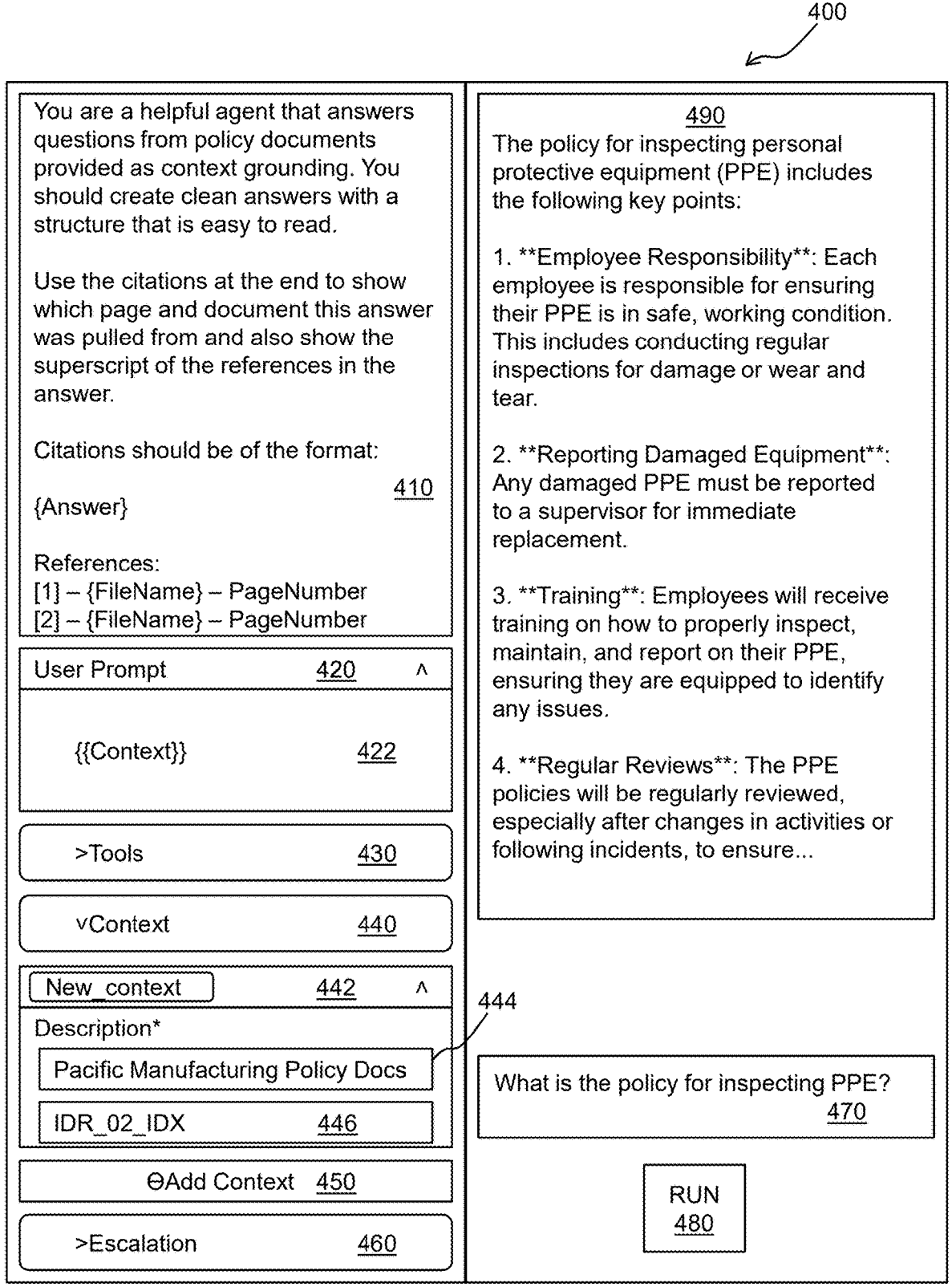
FIG. 4 illustrates an example of AI agent service interface according to one or more embodiments.

FIG. 4 illustrates an example agent service interface 400, according to one or more embodiments. As shown in FIG. 4, the agent answers questions regarding policy documents that are provided within context grounding. An agent instructions pane 410 includes a natural language description entered by a user of what the AI agent is intended to do. A user prompt 420 allows the developer to enter content for a user prompt in a content field 422, if desired. A tools dropdown 430 allows the developer to select tools that the AI agent will utilize, such as using APIs for applications, calling RPA robots to execute RPAs, etc.

A context dropdown 440 allows the developer to configure the context grounding for the AI agent. A context configuration pane 442 allows the developer to provide a description via description field 444 and an Elastic Common Schema (ECS) index via ECS index field 446 for specific policy documents that have information regarding contracts, stipulation and what to do, etc. in this example. The developer can also add context 450 to further supplement the context grounding. User escalation options can be configured via an escalation dropdown 460. A query field 470 allows the user to provide a query that the AI agent will respond to. The AI agent runs the query when the user clicks run button 480. The results during AI agent execution are then shown in execution pane 490 as the AI agent retrieves and outputs them.

Figure 5:
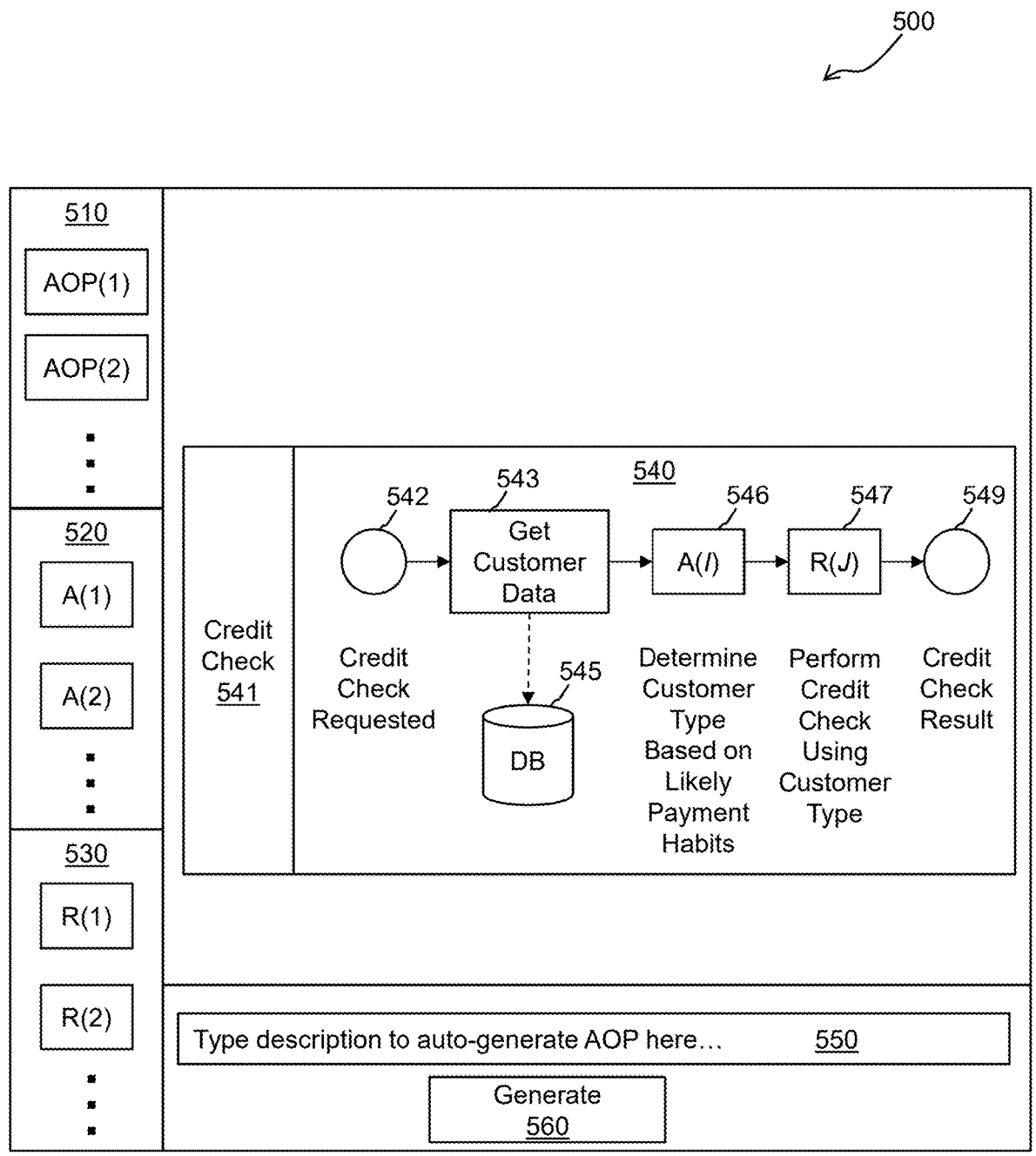
FIG. 5 illustrates an example of AOP development interface according to one or more embodiments.

FIG. 5 illustrates an example of AOP development interface 500, according to one or more embodiments. AOP development interface 500 includes AOPs 510, AI agents 520, and RPA robots 530 that the user can select when developing a business process. These can be selected and dragged to a canvas 540 by an AI agent, an AOP, or a developer to develop the AOP. In this example, a credit check 541 is implemented upon a credit check request 542 by getting customer data 543 from a database 545. Next, an AI agent 546 is called to determine a customer type (e.g., highly likely to pay, likely to miss payments, frequently between jobs, etc.) by analyzing the customer data of the database 545. The type is then provided to an RPA robot 547 that takes this information into account when performing a credit check and producing the credit check result 549. Alternatively, the AI agent, the AOP, or the developer can provide a description of a business process into a field 550 and select a generate button 560. This description is provided to an LLM, which attempts to understand the business process and automatically create the AOP. The AI agent, the AOP, or the developer can then edit the AOP.

Figure 6:
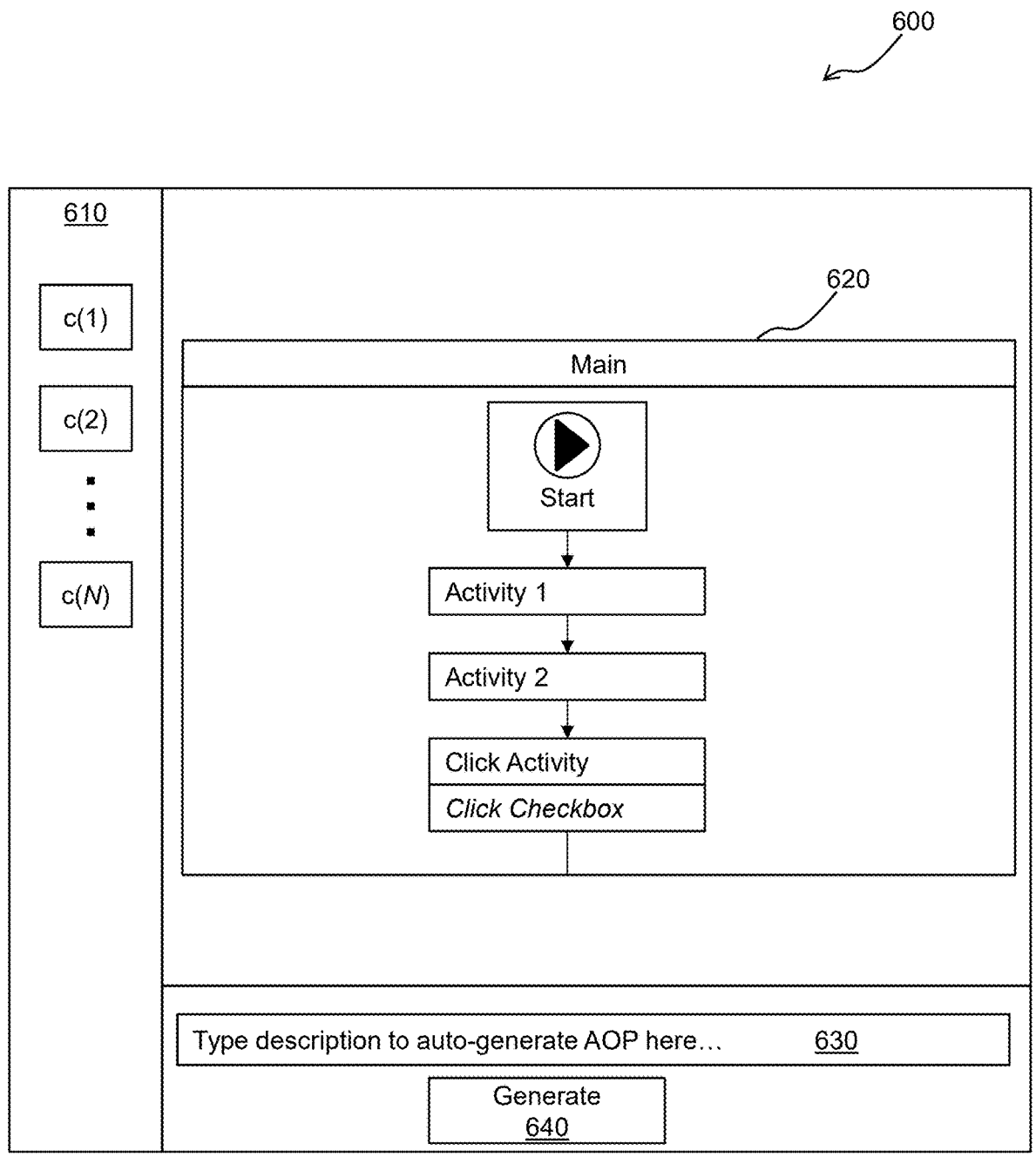
FIG. 6 illustrates an example of RPA development interface according to one or more embodiments.

FIG. 6 illustrates an example of RPA development interface 600, according to one or more embodiments. RPA development interface 600 includes component 610 that an AI agent, a AOP, or a developer can select when developing a workflow for an RPA robot. The AI agent, the AOP, or the developer can be selected and dragged to a canvas 620. Alternatively, the AI agent, the AOP, or the developer can provide a description of a workflow into a field 630 and select a generate button 640. This description is provided to an LLM, which attempts to understand the workflow and automatically create the RPA robot. The AI agent, the AOP, or the developer can then edit the workflow for the RPA robot. It should be noted that the functionality shown and described with respect to FIGS. 4, 5, and 6 may be provided in a single designer application in some embodiments.

Figure 7:
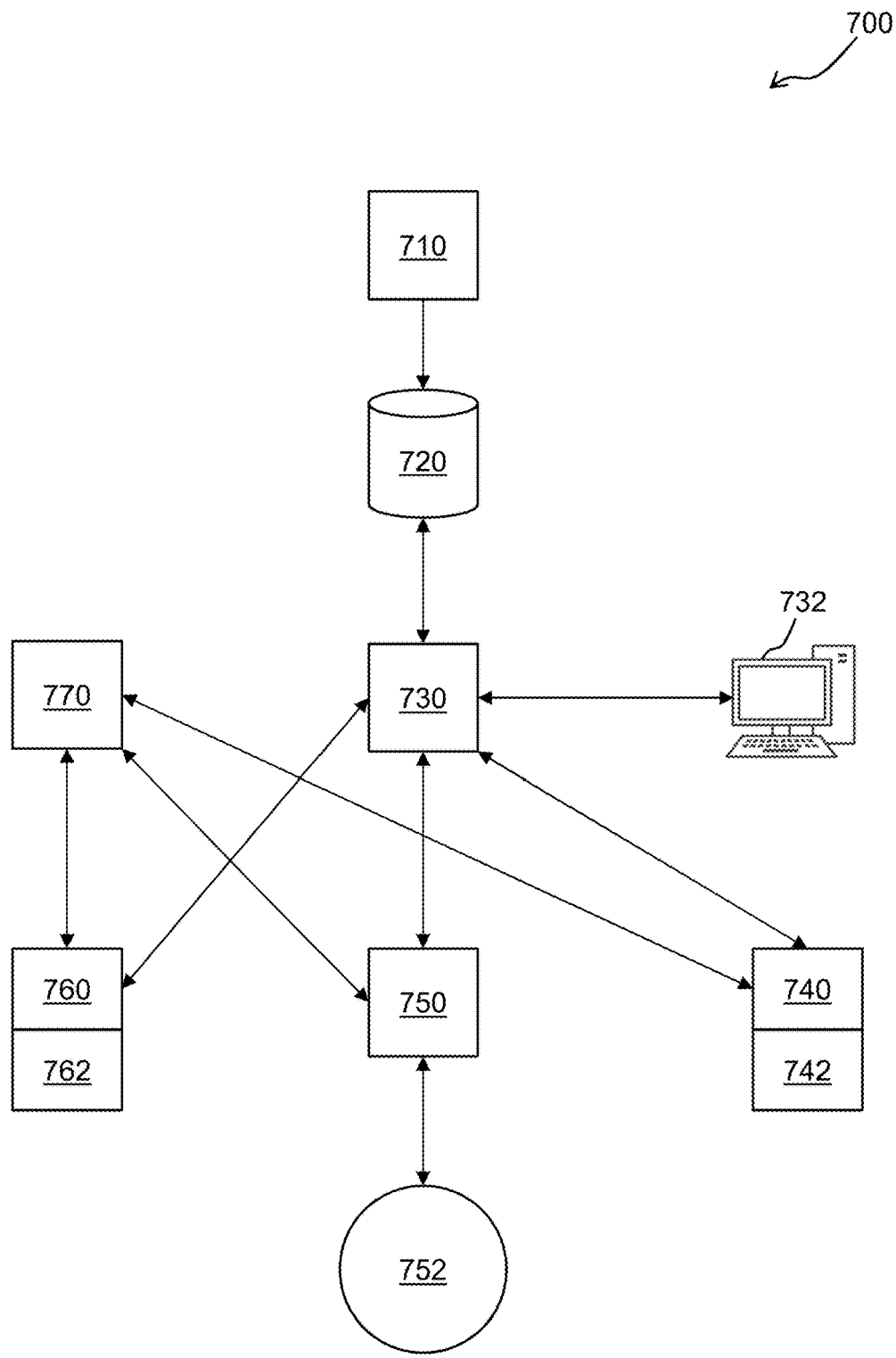
FIG. 7 illustrates an end-to-end AI agent, RPA robot, and AOP development and deployment system according to one or more embodiments.

FIG. 7 illustrates an end-to-end AI agent, RPA robot, and AOP development and deployment system 700, according to one or more embodiments. A designer application 710 allows AI agents, AOPs, and developers to design workflows for subsequent automations (e.g., AOPs, AI agents, and/or RPA robots). Once these subsequent AOPs, AI agents, and/or RPA robots have been tested and validated, the validated and tested AOPs, AI agents, and/or RPA robots are packaged and published to an automation database 720.

A conductor application 730 manages deployments of these packaged and published automations. When software process 732 requests that an automation be run, conductor application 730 sends a start job command to AOP engine 740, which selects and starts the automation from AOPs 742. When executing AOPs 742, steps may be encountered that are implemented by AI agents 750 and/or RPA robots 760. In some cases, AOP engine 740 suspends the executing AOPs 742 and sends a request to conductor application 730 to send a start job request to an appropriate AI agent 750 or RPA robot 760 to execute the step.

In the case of an AI agent being requested, conductor application 730 sends the start job request to the appropriate AI agent 750. This request may include natural language text or other information provided by AOP engine 740 to conductor application 730. AI agent 750 then performs the step by executing an LLM 752 to assist in carrying out the task. AI agent 750 then sends information pertinent to the task (e.g., requested information, an indication that the step was completed, an indication that the step failed, etc.) to conductor 730, which provides this information to AOP engine 740. AOP engine 740 then resumes its operation.

In the case of an RPA robot being requested, conductor application 730 sends the start job request to the appropriate RPA robot 760. RPA robot 760 then executes a requested RPA 762. RPA robot 760 then sends information pertinent to the task (e.g., requested information, an indication that the step was completed, an indication that the step failed, etc.) to conductor application 730, which provides this information to AOP engine 740. The AOP engine 740 then resumes operation.

According to one or more embodiments, user action may be required by an AOP 742, an AI agent 750, or an RPA 762. In this case, the AOP engine 740, the AI agent 750, or the RPA robot 760 contacts a user 770 for a human-in-the-loop operation that contributes to the automation. After the user 770 provides the user action, the AOP engine 740, the AI agent 750, or the RPA robot 760 resumes the automation.

Figure 8:
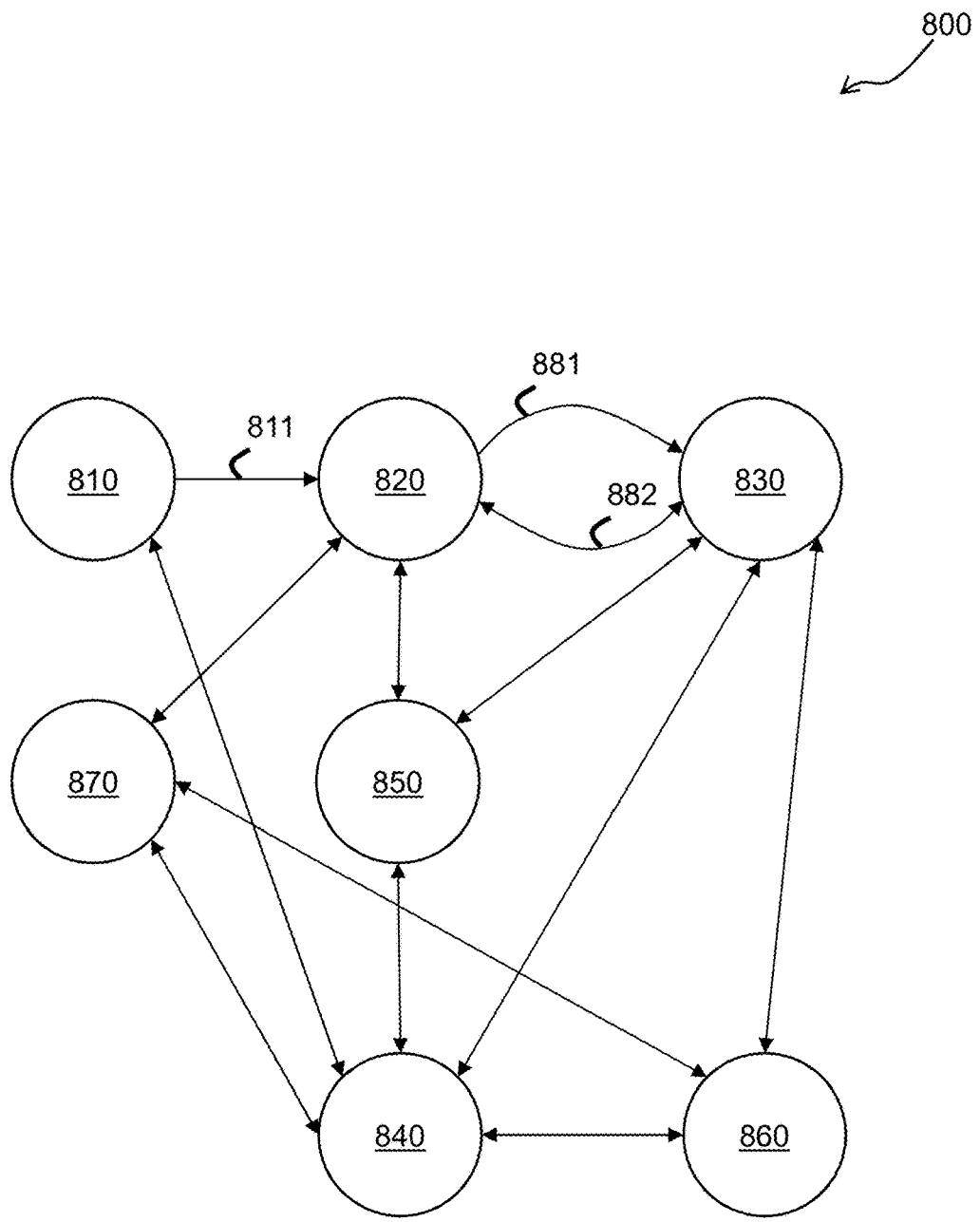
FIG. 8 is an architectural diagram illustrating an agentic automation and RPA system according to one or more embodiments.

FIG. 8 is an architectural diagram illustrating an agentic automation and RPA system 800, according to one or more embodiments. In some embodiments, agentic automation and RPA system 800 is part of hyper-automation system 100 of FIG. 1. Agentic automation and RPA system 800 includes a designer 810 that allows an AI agent, a AOP, or a developer to design automations (e.g., workflows, natural language instructions for AI agents and AOPs, context grounding, tool configurations, RPA robots, AOPs, AI agents etc.). The designer 810 may provide a solution for application integration, as well as automating third-party applications, administrative Information Technology (IT) tasks, and business IT processes. The designer 810 may facilitate development of an automation project, which is a graphical representation of a business process. The designer 810 facilitates the development and deployment (as represented by arrow 811) of automations. The designer 810 may be an application that runs on a user's desktop, an application that runs remotely in a VM, a web application, etc.

The automation project enables automation of rule-based processes by giving an AI agent, a AOP, or a developer control of an execution order and a relationship between a custom set of steps developed in a workflow, i.e., "activities," as described herein. One commercial example of an embodiment of designer 810 is UiPath Studio™ Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable for more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once automation is developed in the designer 810, execution of business processes is orchestrated by the conductor 820, which orchestrates one or more robots 830, one or more AI agents 850, and/or one or more AOPs 870 that execute the workflows developed in the designer 810. One commercial example of an embodiment of the conductor 820 is UiPath Orchestrator™. The conductor 820 facilitates management of the creation, monitoring, and deployment of resources in an environment. Conductor 820 may act as an integration point with third-party solutions and applications. Per the above, in some embodiments, the conductor 820 may be part of core hyper-automation system 120 of FIG. 1.

It should be noted that RPA robots 830 may operate independently for deterministic processes. AI agents 850 and AOPs 870 can also operate independently (e.g., for non-deterministic processes), or utilize RPA robot(s) 830 or other AI agents 850 as tools to accomplish part of their agentic automations. AI agents 850 can drive composite automations that utilize both RPA robots 830 and AI agents 850, or vice versa, and AOPs 870 may include such composite automations.

The conductor 820 may manage a fleet of RPA robots 830 and AI agents 850, connecting and executing (as represented by arrow 881) RPA robots 830 and AI agents 850 from a centralized point (e.g., as requested by an AOP engine that is implementing an AOP). Types of RPA robots 830 that may be managed include, but are not limited to, attended robots, unattended robots, development robots (similar to unattended robots, but used for development and testing purposes), and nonproduction robots (similar to attended robots, but used for development and testing purposes). Attended robots are triggered by user events and operate alongside a user on the same computing system. Attended robots may be used with conductor 820 for a centralized process deployment and logging medium. Attended robots may help the user accomplish various tasks and may be triggered by user events. In some embodiments, processes cannot be started from conductor 820 on this type of robot and/or they cannot run under a locked screen. In certain embodiments, attended robots can only be started from a robot tray or from a command prompt. Attended robots should run under user supervision in some embodiments.

Unattended robots run unattended in virtual environments and can automate many processes. Unattended robots may be responsible for remote execution, monitoring, scheduling, and providing support for work queues. Debugging for all robot types may be run in the designer 810 in some embodiments. Both attended and unattended robots may automate various systems and applications including, but not limited to, mainframes, web applications, VMs, enterprise applications (e.g., those produced by SAP®, Salesforce®, Oracle®, etc.), and computing system applications (e.g., desktop and laptop applications, mobile device applications, wearable computer applications, etc.).

The conductor 820 may have various capabilities (as represented by arrow 882) including, but not limited to, provisioning, deployment, configuration, queueing, monitoring, logging, and/or providing interconnectivity. Provisioning may include creating and maintenance of connections between RPA robots 830, AI agents 850, and/or AOPs 870 and conductor 820 (e.g., a web application). Deployment may include assuring the correct delivery of package versions to assigned RPA robots 830, AI agents 850, and/or AOPs 870 for execution. Configuration may include maintenance and delivery of RPA robot and AI agent environments and process configurations. Queueing may include providing management of queues and queue items. Monitoring may include keeping track of robot and AI agent identification data and maintaining user permissions. Logging may include storing and indexing logs to a database (e.g., a structured query language (SQL) database or a "not only" SQL (NoSQL) database) and/or another storage mechanism (e.g., ElasticSearch®, which provides the ability to store and quickly query large datasets). Conductor 820 may provide interconnectivity by acting as the centralized point of communication for third-party solutions and/or applications.

The RPA robots 830 are execution agents that implement workflows built in the designer 810. One commercial example of some embodiments of RPA robots 830 is UiPath Robots™. In some embodiments, the RPA robots 830 install the Microsoft Windows® Service Control Manager (SCM)—managed service by default. As a result, such RPA robots 830 can open interactive Windows® sessions under the local system account, and have the rights of a Windows® service.

In some embodiments, the RPA robots 830 can be installed in a user mode. For such RPA robots 830, this means they have the same rights as the user under which a given RPA robot 830 has been installed. This feature may also be available for high density (HD) robots, which ensure full utilization of each machine at its maximum potential. In some embodiments, any type of the RPA robot 830 may be configured in an HD environment.

The RPA robots 830 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 820 and the execution hosts (i.e., the computing systems on which the RPA robots 830 are executed). These services are trusted with and manage the credentials for RPA robots 830. A console application is launched by the SCM under the local system.

User mode robot services in some embodiments manage and monitor Windows® sessions and act as a proxy between conductor 820 and the execution hosts. User mode robot services may be trusted with and manage the credentials for RPA robots 830. A Windows® application may automatically be launched if the SCM-managed robot service is not installed.

Executors may run given jobs under a Windows® session (i.e., they may execute workflows. Executors may be aware of per-monitor dots per inch (DPI) settings. The AI agents 850 may be Windows® Presentation Foundation (WPF) applications that display the available jobs in the system tray window. Note that these agents differ from the AI agents 850. The AI agents 850 may be a client of the service and may request to start or stop jobs and change settings. The command line is a client of the service. The command line is a console application that can request to start jobs and wait for their output.

Having components of the RPA robots 830 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from the designer 810 may also be independent of browser zoom level in some embodiments. For applications that are DPI-unaware or intentionally marked as unaware, DPI may be disabled in some embodiments.

The agentic automation and RPA system 800 in this embodiment is part of a hyper-automation system, such as hyper-automation system 100 of FIG. 1. Developers may use the designer 810 to build and test RPAs, AOPs, and AI agents that utilize AI/ML models deployed in core hyper-automation system 840 (e.g., as part of an AI center thereof). Such RPA robots may send input for execution of the AI/ML model(s) and receive output therefrom via core hyper-automation system 840.

One or more of the RPA robots 830 may be listeners, as described above. These listeners may provide information to core hyper-automation system 840 regarding what users are doing when they use their computing systems. This information may then be used by core hyper-automation system for process mining, task mining, task capture, etc.

An assistant/chatbot (of the conductor 820) may be provided on user computing systems to allow users to launch local RPA robots. The assistant/chatbot may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which an RPA robot or AI agent is executing or on another computing system that the robot or AI agent provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 540 and then used later for training a new version of the AI/ML model.

Figure 9:
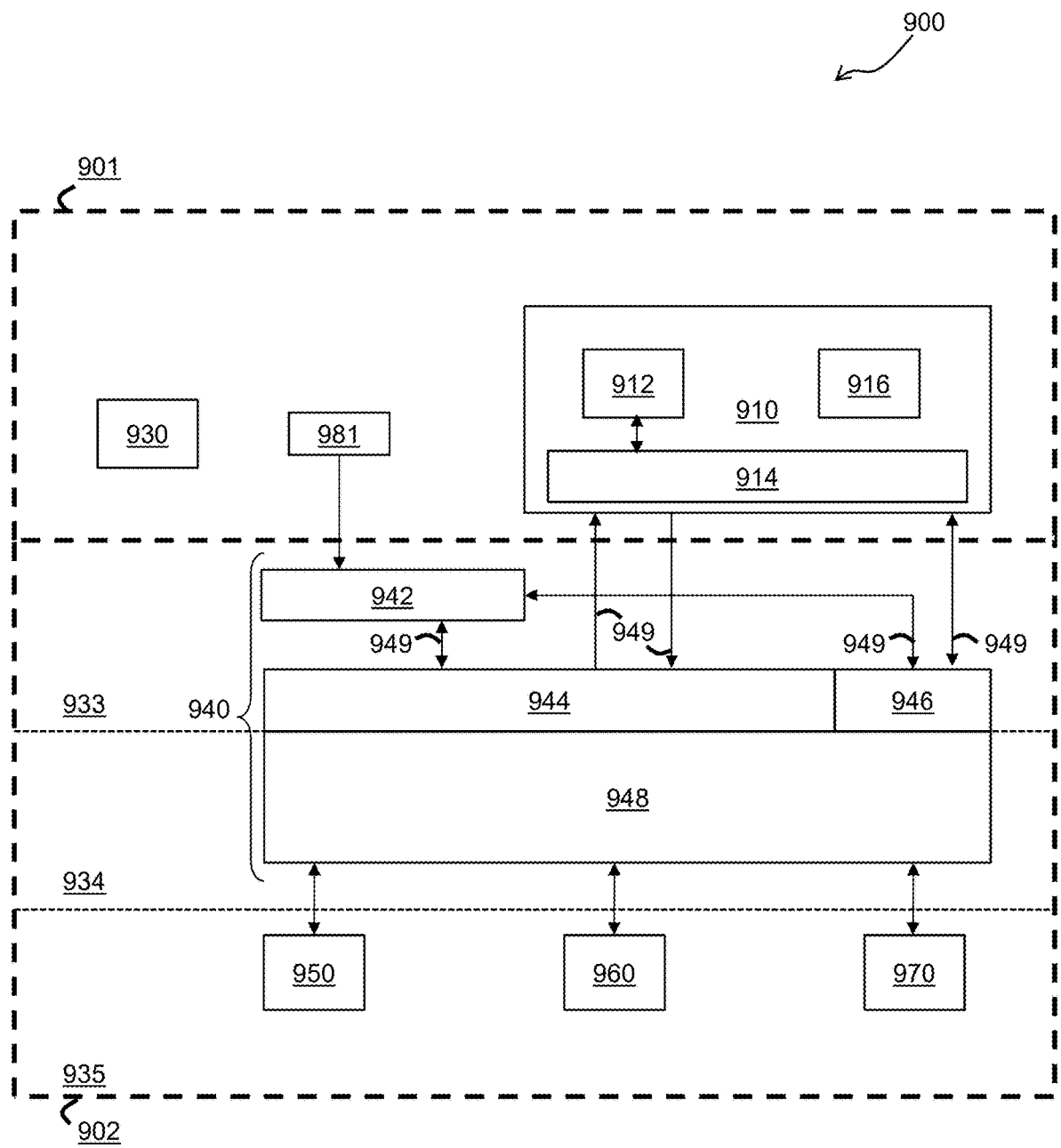
FIG. 9 is an architectural diagram illustrating a deployed RPA system according to one or more embodiments.

FIG. 9 is an architectural diagram illustrating a deployed RPA system 900, according to one or more embodiments. In some embodiments, RPA system 900 may be a part of agentic automation and RPA system 800 of FIG. 8 and/or hyper-automation system 100 of FIG. 1. It should be noted that the architecture of deployed RPA system 900 may not be used in some embodiments. Deployed RPA system 900 may be a cloud-based system, an on-premises system, a desktop-based system that offers enterprise level, user level, or device level automation solutions for automation of different computing processes, etc.

It should be noted that a client side 901, a server side 902, or both, may include any desired number of computing systems without deviating from the scope of the invention. On the client side 901, a robot application 910 includes executors 912, an execution agent 914, and a designer 916. However, in some embodiments, the designer 916 may not be running on the same computing system as executors 912 and execution agent 914. Executors 912 are running processes. Several business projects may run simultaneously. Execution agent 914 (e.g., a Windows® service) is the single point of contact for all executors 912 in this embodiment. Execution agent 914 is also responsible for sending the status of the robot (e.g., periodically sending a "heartbeat" message indicating that the robot is still functioning) and downloading the required version of the package to be executed.

A listener 930 monitors and records data pertaining to user interactions with an attended computing system and/or operations of an unattended computing system on which listener 930 resides. The listener 930 may be an RPA robot, a AOP, an AI agent, part of an operating system, a downloadable application for the respective computing system, or any other software and/or hardware without deviating from the scope of the invention. Indeed, in some embodiments, the logic of the listener is implemented partially or completely via physical hardware.

On the server side 902, a presentation layer 933, a service layer 934, and a persistence layer 935 are provided, as well as a conductor 940. Further, the presentation layer 933 includes a web application 942, Open Data Protocol (oData) Representative State Transfer (REST) Application Programming Interface (API) endpoints 944, and notification and monitoring 946 and the service layer 934 includes an API implementation/business logic 948). Thus, as shown in FIG. 9, the conductor 940 includes the web application 942, the oData REST API endpoints 944, the notification and monitoring 946, and the API implementation/business logic 948. The persistence layer 935 includes a database server 950, an AI/ML server 960, and an indexer server 970.

The communication between execution agent 914 and conductor 940 is always initiated by execution agent 914 in some embodiments. In the notification scenario, execution agent 914 may open a WebSocket channel that is later used by conductor 940 to send commands to the RPA robot (e.g., start, stop, etc.). It should be noted that, while not shown here in order to reduce clutter in FIG. 9, AI agents can also interact with the conductor 940, as discussed above with respect to FIGS. 1 and 8, for example. The conductor 940 may orchestrate the operations of the AI agents, AOPs, and RPA robots.

All messages in this embodiment are logged into the conductor 940, which processes them further via the database server 950, the AI/ML server 960, the indexer server 970, or any combination thereof. As discussed herein, and with respect to FIG. 8, executors 912 may be robot components.

In some embodiments, an RPA robot represents an association between a machine name and a username. The robot may manage multiple executors at the same time. On computing systems that support multiple interactive sessions running simultaneously (e.g., Windows® Server 2012), multiple RPA robots may be running at the same time, each in a separate Windows® session using a unique username.

The conductor 940 may also facilitate interaction between the AI agents and AI/ML models via AI/ML server 960, which may store and/or facilitate access to generative AI models (e.g., the generative AI models 172 of FIG. 1).

In some embodiments, most actions that a user performs in the interface of conductor 940 (e.g., via a browser 981) are performed by calling various APIs. Such actions may include, but are not limited to, starting jobs on robots, adding/removing data in queues, scheduling jobs to run unattended, etc. without deviating from the scope of the invention. The web application 942 is the visual layer of the server platform. In this embodiment, the web application 942 uses Hypertext Markup Language (HTML) and JavaScript (JS). However, any desired markup languages, script languages, or any other formats may be used without deviating from the scope of the invention. The user interacts with web pages from web application 942 via the browser 941 in this embodiment in order to perform various actions to control the conductor 940. For instance, the user may create RPA robot groups, assign packages to the RPA robots, analyze logs per RPA robot and/or per process, start and stop RPA robots, etc.

In addition to web application 942, the conductor 940 also includes service layer that exposes the oData REST API endpoints 944. However, other endpoints may be included without deviating from the scope of the invention. The REST API is consumed by both the web application 942 and the execution agent 914. Execution agent 914 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 940. Queueing REST endpoints may be responsible for queues and queue item management, such as adding data to a queue, obtaining a transaction from the queue, setting the status of a transaction, etc.

Monitoring REST endpoints may monitor web application 942 and execution agent 914. Notification and monitoring API 946 may be REST endpoints that are used for registering execution agent 914, delivering configuration settings to execution agent 914, and for sending/receiving notifications from the server and execution agent 914. Notification and monitoring API 946 may also use WebSocket communication in some embodiments. As shown in FIG. 9, one or more activities/actions described herein are represented by arrows 949.

The APIs in the service layer 934 may be accessed through configuration of an appropriate API access path in some embodiments, e.g., based on whether conductor 940 and an overall hyper-automation system have an on-premises deployment type or a cloud-based deployment type. APIs for conductor 940 may provide custom methods for querying stats about various entities registered in conductor 940. Each logical resource may be an oData entity in some embodiments. In such an entity, components such as the robot, process, queue, etc., may have properties, relationships, and operations. APIs of conductor 940 may be consumed by web application 942 and/or execution agents 914 in two ways in some embodiments: (1) by getting the API access information from conductor 940; or (2) by registering an external application to use the oAuth flow.

The persistence layer 935 includes a trio of servers in this embodiment—database server 950 (e.g., a SQL server), AI/ML server 960 (e.g., a server providing AI/ML model serving services, such as AI center functionality) and the indexer server 970. Database server 950 in this embodiment stores the configurations of the robots and AI agents, robot and AI agent groups, AOPs, associated processes, users, roles, schedules, etc. This information is managed through the web application 942 in some embodiments. Database server 950 may manage queues and queue items. In some embodiments, database server 950 may store messages logged by the robots and AI agents (in addition to or in lieu of indexer server 970). Database server 950 may also store process mining, task mining, and/or task capture-related data, received from the listener 930 installed on the client side, for example. While no arrow is shown between the listener 930 and the database 950, it should be understood that the listener 930 is able to communicate with the database 950, and vice versa in some embodiments. This data may be stored in the form of PDDs, images, XAML files, etc. It should be noted that structured and/or unstructured data may be stored. Listener 930 may be configured to intercept user actions, processes, tasks, and performance metrics on the respective computing system on which the listener 930 resides. For example, the listener 930 may record user actions (e.g., clicks, typed characters, locations, applications, active elements, times, etc.) on its respective computing system and then convert these into a suitable format to be provided to and stored in database server 950.

AI/ML server 960 facilitates incorporation of AI/ML models into automations. Pre-built AI/ML models, model templates, and various deployment options may make such functionality accessible even to those who are not data scientists. Deployed automations (e.g., RPA robots and/or AI agents) may call AI/ML models from the AI/ML server 960. Performance of the AI/ML models may be monitored and be trained and improved using user-validated data. The AI/ML server 960 may schedule and execute training jobs to train new versions of the AI/ML models. AI/ML model server may also store and/or access generative AI models.

The AI/ML server 960 may store data pertaining to AI/ML models and ML packages for configuring various ML skills for a user at development time. An ML skill, as used herein, is a pre-built and trained ML model for a process, which may be used by an automation, for example. The AI/ML server 960 may also store data pertaining to document understanding technologies and frameworks, algorithms and software packages for various AI/ML capabilities including, but not limited to, intent analysis, NLP, speech analysis, different types of AI/ML models, etc.

The indexer server 970, which is optional in some embodiments, stores and indexes the information logged by the robots. In certain embodiments, the indexer server 970 may be disabled through configuration settings. In some embodiments, the indexer server 970 uses ElasticSearch®, which is an open source project full-text search engine. Messages logged by robots (e.g., using activities like log message or write line) may be sent through the logging REST endpoint(s) to the indexer server 970, where they are indexed for future utilization.

Figure 10:
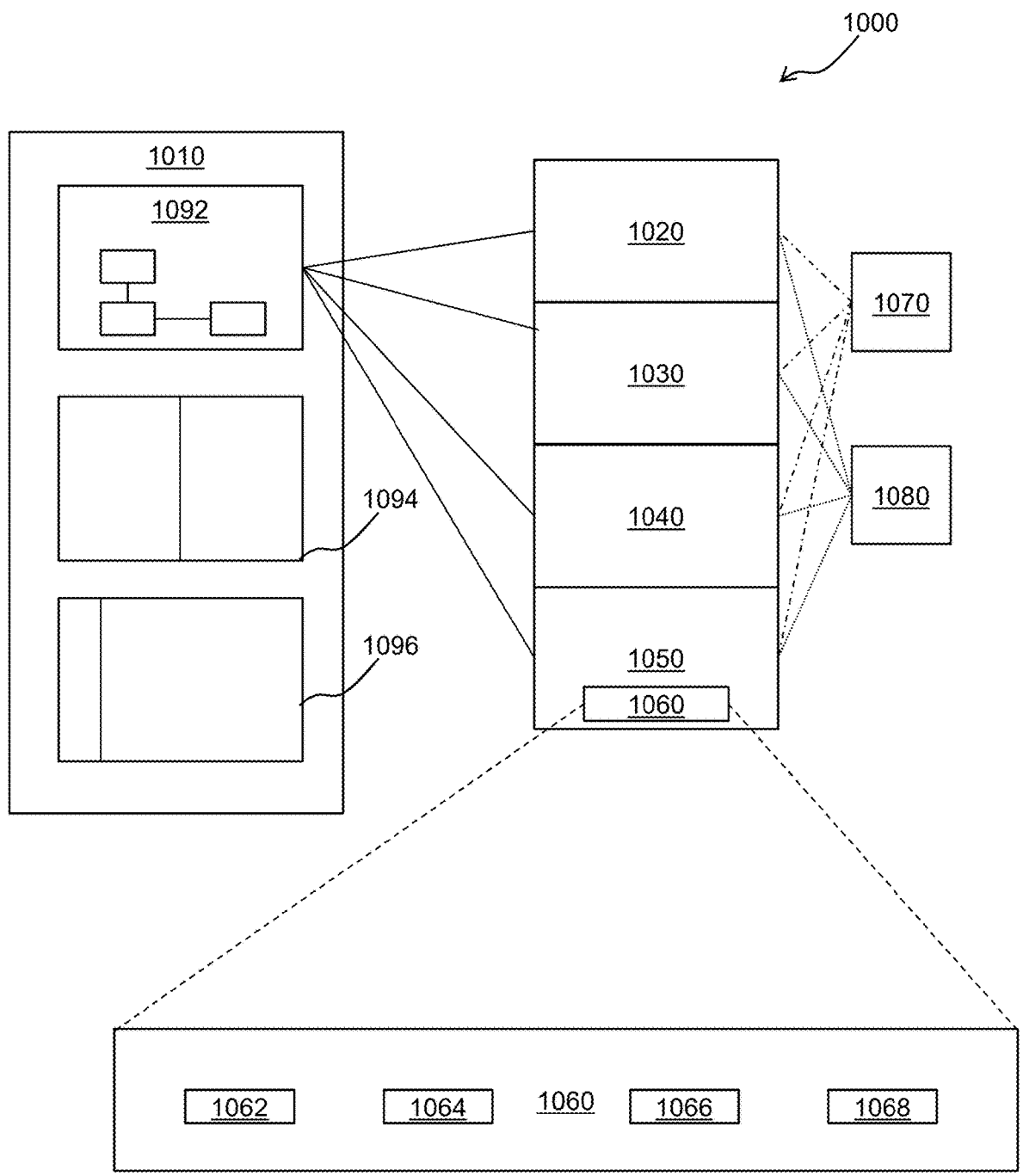
FIG. 10 is an architectural diagram illustrating the relationship between a designer, activities, and drivers according to one or more embodiments.

FIG. 10 is an architectural diagram illustrating the relationship 1000 between a designer 1010, activities 1020, 1030, 1040, 1050, drivers 1060, APIs 1070, and AI/ML models 1080, according to one or more embodiments. Per the above, an AI agent, an AOP, or a developer uses the designer 1010 to develop workflows for automations (e.g., workflows executed by RPA robots, AI agents, and AOPs).

The AI agent, the AOP, or the developer can design and configure workflows 1092, design and configure agentic automations 1094 for AI agents (e.g., providing natural language descriptions, context grounding, tools, etc. for AI agents), and design and configure AOPs 1096 (see also FIGS. 4B, 5, and 6). The various types of activities may be displayed to the developer in some embodiments. The designer 1010 may be local to the user's computing system or remote thereto (e.g., accessed via VM or a local web browser interacting with a remote web server). Workflows for RPA robots may include user-defined activities 1020, API-driven activities 1030, AI/ML activities 1040, and/or UI automation activities 1050. User-defined activities 1020 and API-driven activities 1040 interact with applications via their APIs. User-defined activities 1020 and/or AI/ML activities 1040 may call one or more AI/ML models 1080 in some embodiments, which may be located locally to the computing system on which the robot is operating and/or remotely thereto.

Some embodiments are able to identify non-textual visual components in an image, which is called CV herein. However, it should be noted that in some embodiments, CV incorporates OCR. CV may be performed at least in part by AI/ML model(s) 1080. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 1020. However, any number and/or type of activities may be used without deviating from the scope of the invention.

UI automation activities 1050 are a subset of special, lower-level activities that are written in lower-level code and facilitate interactions with the screen. UI automation activities 1050 facilitate these interactions via drivers 1060 that allow the robot to interact with the desired software. For instance, drivers 1060 may include operating system (OS) drivers 1062, browser drivers 1064, VM drivers 1066, enterprise application drivers 1068, etc. One or more of AI/ML models 1080 may be used by UI automation activities 1050 in order to perform interactions with the computing system in some embodiments. In certain embodiments, AI/ML models 1080 may augment drivers 1060 or replace them completely. Indeed, in certain embodiments, drivers 1060 are not included.

Drivers 1060 may interact with the OS at a low level looking for hooks, monitoring for keys, etc. via OS drivers 1062. Drivers 1060 may facilitate integration with Chrome®, IER, Citrix®, SAP®, etc. For instance, the "click" activity performs the same role in these different applications via drivers 1060.

Figure 11:
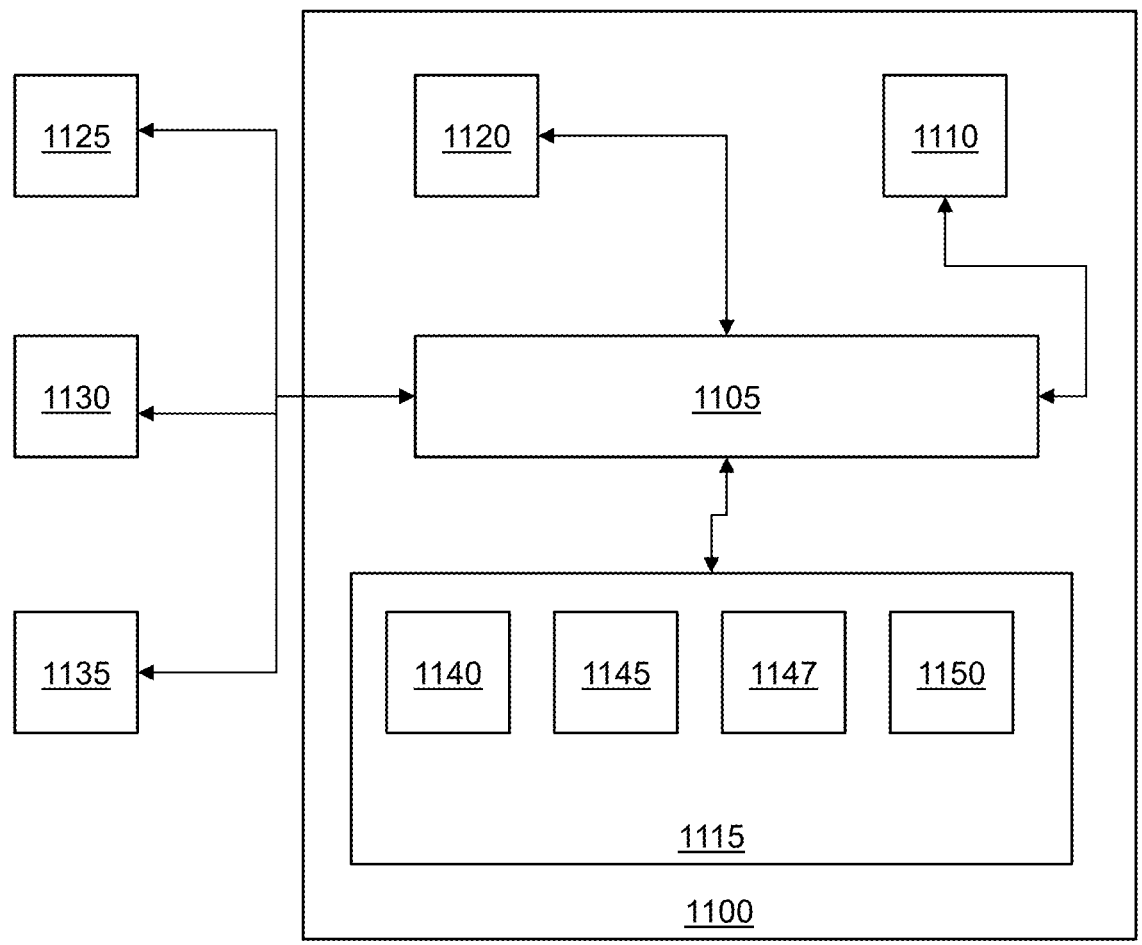
FIG. 11 is an architectural diagram illustrating a computing system configured to perform agentic automation and orchestration according to one or more embodiments.

FIG. 11 is an architectural diagram illustrating a computing system 1100 configured to provide advanced agentic extraction and searching for context grounding within automations, according to one or more embodiments. In some embodiments, computing system 1100 may be one or more of the computing systems depicted and/or described herein. In certain embodiments, computing system 1100 may be part of a hyper-automation system, such as that shown in FIGS. 1 and 8. Computing system 1100 includes a bus 1105 or other communication mechanism for communicating information, and processor(s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes a memory 1115 for storing information and instructions to be executed by processor(s) 1110. Memory 1115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both. Computing system 1100 includes a communication device 1120, such as a transceiver, to provide access to a communications network via a wireless and/or wired connection. In some embodiments, communication device 1120 may include one or more antennas that are singular, arrayed, phased, switched, beamforming, beamsteering, a combination thereof, and/or any other antenna configuration without deviating from the scope of the invention.

Processor(s) 1110 are further coupled via bus 1105 to a display 1125. Any suitable display device and haptic I/O may be used without deviating from the scope of the invention. A keyboard 1130 and a cursor control device 1135, such as a computer mouse, a touchpad, etc., are further coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100.

The modules further include an extraction and searching module 1145 that is configured to perform all or part of the processes described herein or derivatives thereof including, but not limited, to execute advanced agentic extraction and searching for context grounding within automations. The extraction and searching module 1145 is configured to perform RAG, extraction, and semantic storage. RAG is a technique that retrieves relevant data chunks from a document repository and integrates the relevant data chunks into prompts for AI models to enhance response accuracy. Extraction is a process of parsing various document formats (e.g., portable document format (PDF) documents or PDFs) to extract meaningful text and flatten complex data structures (e.g., tables and images) for storage and retrieval. Semantic storage includes storing extracted information in a manner that supports semantic search and retrieval, allowing searches based on meaning rather than exact matches, using vector embeddings (numerical representations of text).

The modules further include an agentic memory module 1147 that is configured to perform all or part of the processes described herein or derivatives thereof including, but not limited, to execute agentic memory storing context grounding and other results for automations. By way of example, the agentic memory module 1147 is configured to dynamic cache (i.e., storing) escalations, tool calls, user interaction(s)

or feedback, context grounding, etc. to provide enhanced efficiency and minimizing calls.

Computing system 1100 may include one or more additional functional modules 1150 that include additional functionality.

One skilled in the art will appreciate that a "computing system" could be embodied as a server, an embedded computing system, a personal computer, a console, a personal digital assistant (PDA), a mobile phone, a tablet computing device, a smart watch, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a LAN, a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit including custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 12A:
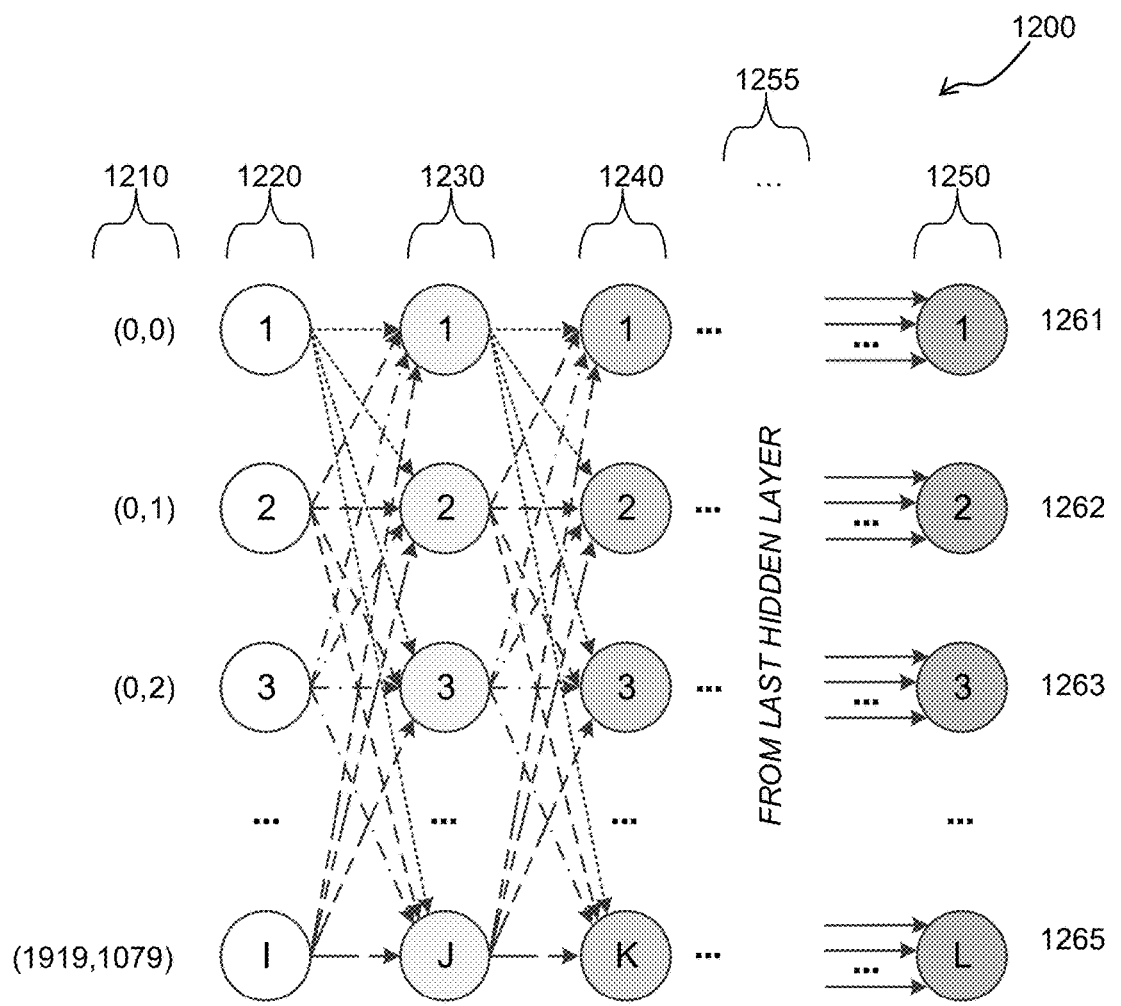
FIG. 12A illustrates an example of a neural network that has been trained to perform agentic automation and orchestration according to one or more embodiments.

Various types of AI/ML models may be trained and deployed without deviating from the scope of the invention. For instance, FIG. 12A illustrates an example of a neural network 1200 that has been trained to receive inputs (as represented by column 1210) for input "neurons" 1 to I of an input layer (as represented by column 1220), according to one or more embodiments. The neural network 1200 includes a number of hidden layers (as represented by column 1230 and 1240). Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers (e.g., the hidden layers), and an output layer (as represented by column 1250), as is the case in neural network 1200.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 12A, data of diverse industries and applications, unique industry terminology, complex document structures, and enterprise-specific information with pretrained knowledge, etc. are provided as the input layer and fed as inputs to the J neurons of hidden layer 1. Various other inputs are possible, including, but not limited to, computing system state information, published automations, business rules, information regarding what workflows and/or tasks pertain to, initial definitions of automations, process automation documents, etc. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 (1240) receives inputs from hidden layer 1 (1230), hidden layer 3 receives inputs from hidden layer 2 (1240), and so on for all hidden layers until the last hidden layer (as represented by the ellipses 1255) provides its outputs as inputs for the output layer. While multiple suggestions are shown here as output, in some embodiments, only a single output suggestion is provided. In certain embodiments, the suggestions are ranked based on confidence scores. In this embodiment, the outputs are accurate responses to specialized or recent queries.

It should be noted that numbers of neurons I, J, K, and L are not necessarily equal. Thus, any desired number of layers may be used for a given layer of neural network 1200 without deviating from the scope of the invention. Indeed, in certain embodiments, the types of neurons in a given layer may not all be the same.

Neural network 1200 is trained to assign confidence score(s) to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored. According to one or more embodiments, the output layer 1250 indicates that two text fields (as represented by outputs 1261 and 1262), a text label (as represented by output 1263), and a submit button (as represented by output 1265) were found. Neural network 1200 may provide the locations, dimensions, images, and/or confidence scores for these elements without deviating from the scope of the one or more embodiments herein, which can be used subsequently by an RPA robot or another automation that uses this output for a given purpose.

Neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 12B:
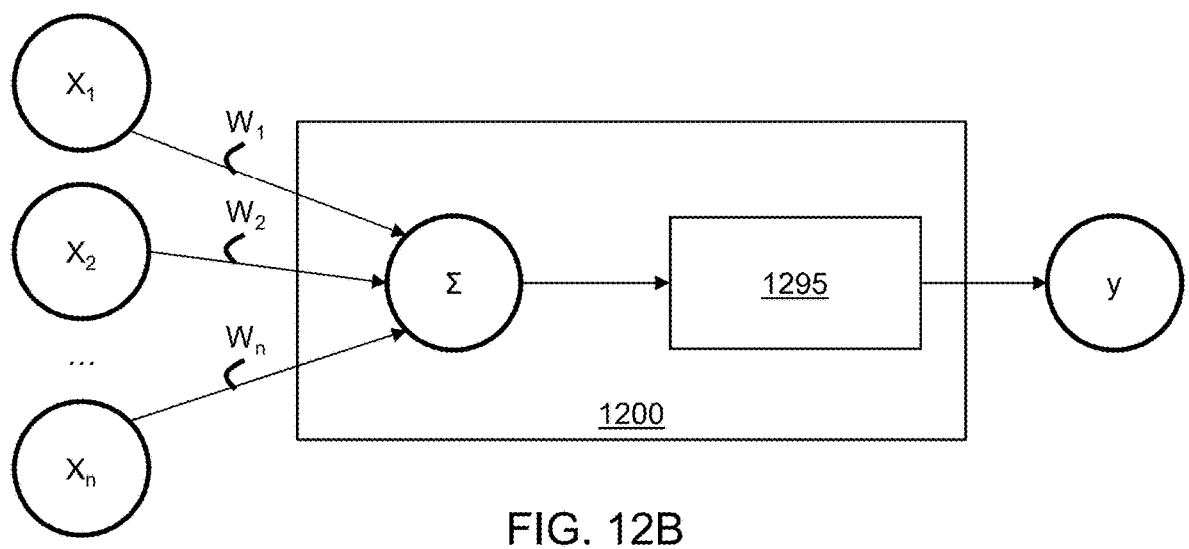
FIG. 12B illustrates an example of a neuron according to one or more embodiments.

An example of a neuron 1295 is shown in FIG. 12B. Inputs $x_1, x_2, \ldots, x_n$ from a preceding layer are assigned respective weights $w_1, w_2, \ldots, w_n$. Thus, the collective input from preceding neuron 1 is $w_1 x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 1295 may thus be given by:

$$y = f(x)\sum_{i=1}^{m}(w_i x_i) + \text{bias} \tag{3}$$

In this case, neuron 1295 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 1200. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer $i=1, \ldots, N$ of the network, with the output at a given layer first multiplied by a synaptic matrix $W_i$, and with a bias vector $b_i$ added. The network output o, given by $$o = f_N(W_N f_{N-1}(W_{N-1} f_{N-2}(\ldots f_1(W_1 x + b_1) \ldots) + b_{N-1}) + b_N) \tag{4}$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o-$^-$ t. This global error is then propagated backwards giving local errors for weight updates with computations similar to, but not exactly the same as, those used for forward propagation. In particular, the backpropagation step typically requires an activity function of the form $p_j(n_j)=f'_j(n_j)$, where $n_j$ is the network activity at layer j (i.e., $n_j = W_j o_{j-1}+b_j$) where $o_j=f_j(n_j)$ and the apostrophe' denotes the derivative of the activity function $f$.

The weight updates may be computed via the formulae:

$$d_j = \begin{cases} (o-t) \circ p_j(n_j), & j = N \\ W^T_{j+1} d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where ○ denotes a Hadamard product (i.e., the element-wise product of two vectors), T denotes the matrix transpose, and $o_j$ denotes $f_j(W_j o_{j-1}+b)$, with $O_0=x$. Here, the learning rate n is chosen with respect to machine learning considerations. Below, n is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. For example, one AI/ML model may be trained to recognize images, another may recognize text, yet another may recognize semantic and/or ontological associations, etc.

It should be noted that in addition to or in lieu of neural networks, some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

NLP models such as word2vec, BERT, GPT-3, ChatGPT, other LLMs, etc. may be used in some embodiments to facilitate semantic understanding and provide more accurate and human-like answers, per the above. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 13:
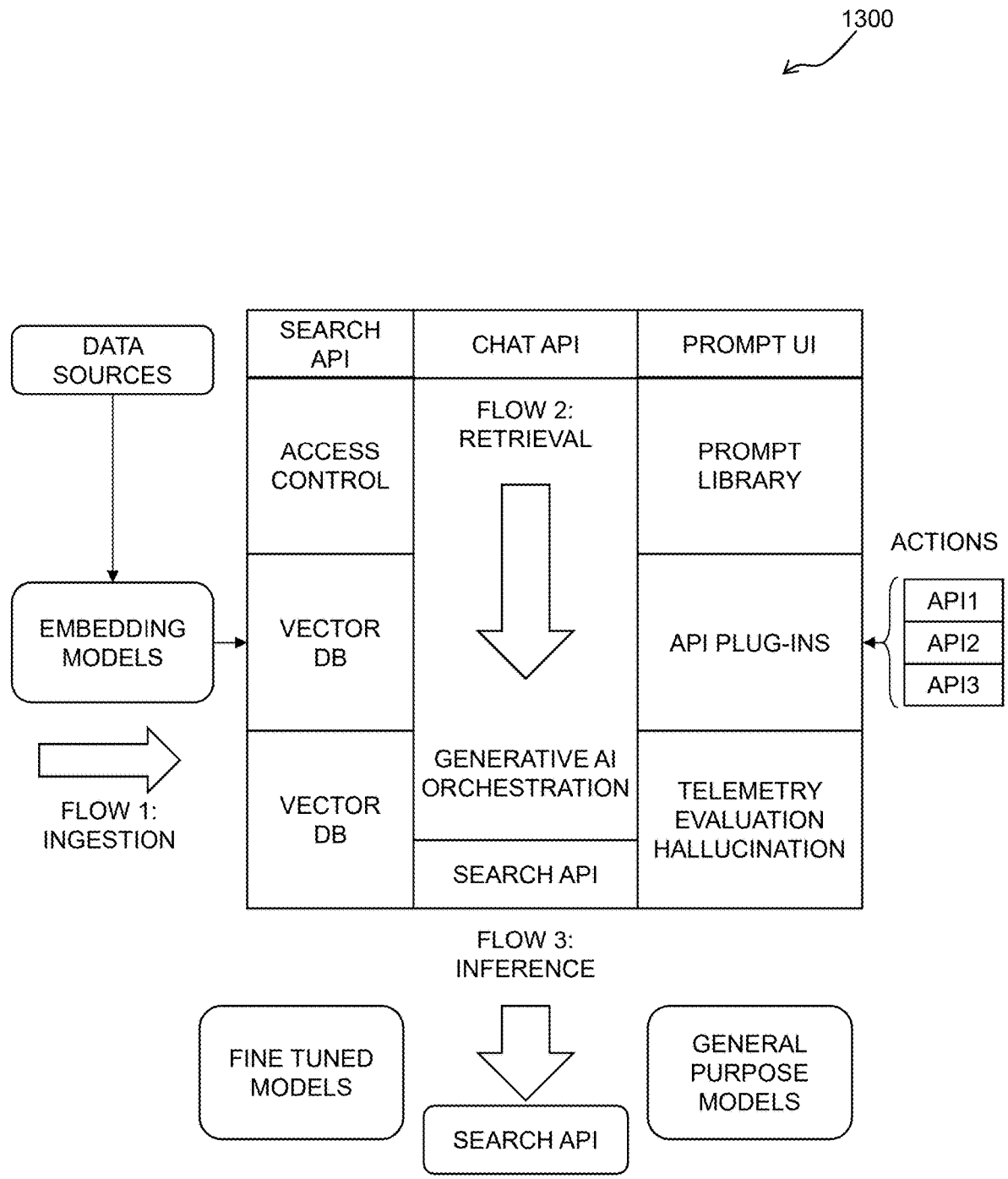
FIG. 13 is an architectural diagram illustrating a reference architecture for a generative AI model according to one or more embodiments.

FIG. 13 is an architectural diagram illustrating a reference architecture 1300 for a generative AI model, according to one or more embodiments. The architecture consists of several layers: API plug-ins, a prompt library, vector data source ingestion, access processing control, a model-training pipeline, an assessment layer to assess hallucination/telemetry/evaluations, a BYOM embedding layer, and an LLM orchestration layer. There are also retrieval plug-ins, access control plug-ins, and API plug-ins that integrate into enterprise systems.

There are three main flows in the reference architecture 1300.

Flow 1: Ingestion can include a data ingestion and training flow. For example, data is read from multiple data stores, preprocessed, chunked, and trained through an embedding model (e.g., RAG and a training pipeline (i.e., fine-tuning). The vector database stores the chunked document embeddings (e.g., vector embeddings) that allow for better semantic, similarity-based data retrievals.

Flow 2: Retrieval can include prompt augmentation using data retrieval flow. For example, once a user query arrives at the API layer, the prompt is selected, followed by data retrievals through the vector database or API plug-ins to get the right contextual data before the prompt is passed to the LLM layer.

Flow 3: Inference can include LLM inference flow. For example, this is where there is a choice to use general purpose foundation models from or a self-hosted foundation model. Fine-tuned models may be used when tuned for a specific task or use case. The response is evaluated for accuracy and other metrics, including hallucinations.

It should be noted that in some embodiments, a generative AI model with multiple "heads" may be used. Heads refer to output layers of the generative AI model. Generative AI models, such as generative AI models 172 in FIG. 1, typically have a sequence of layers, and each head will often share the first few layers of the model before diverging into their own distinct layers.

Figure 14:
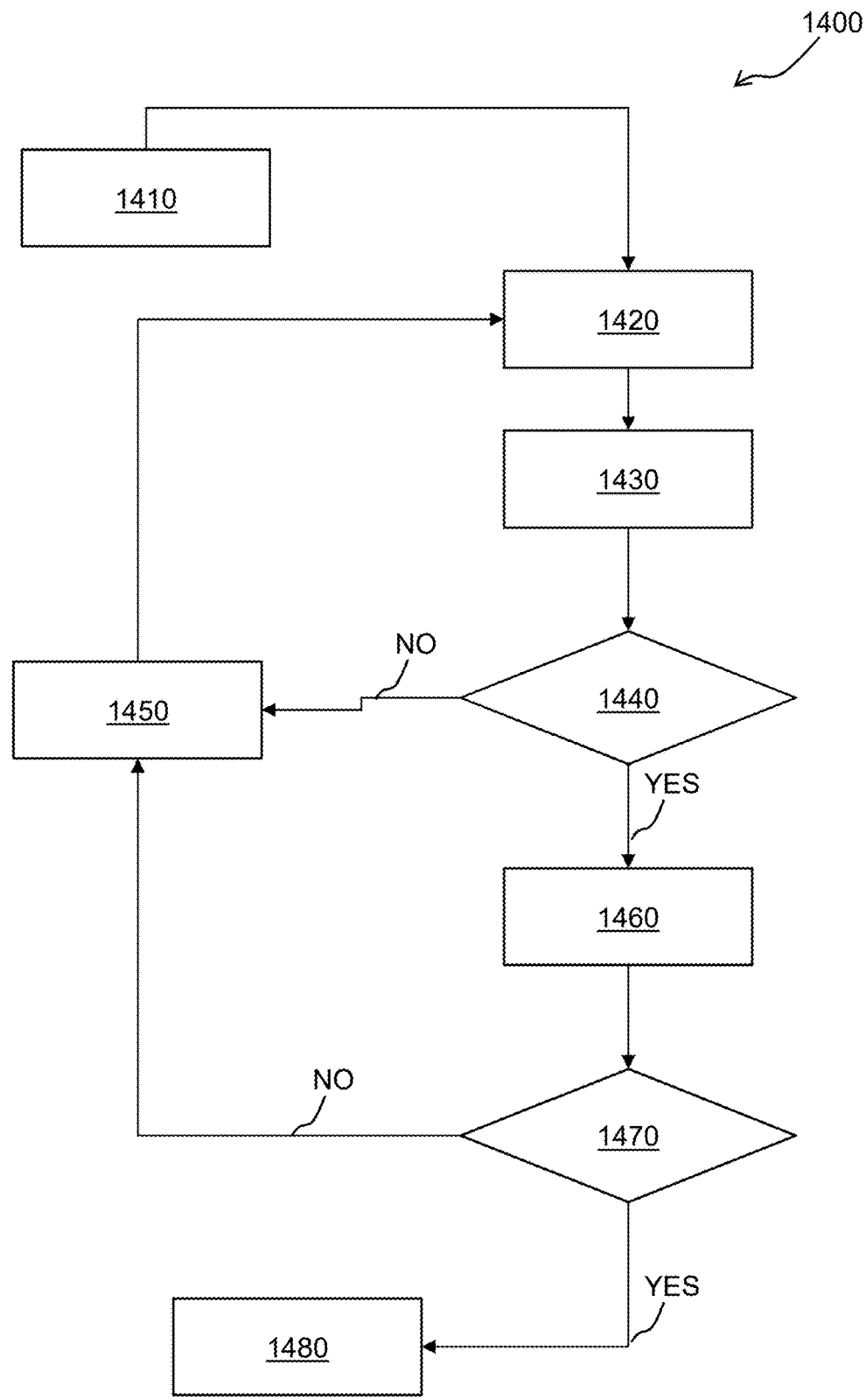
FIG. 14 is a flowchart illustrating a process for training AI/ML model(s) according to one or more embodiments.

FIG. 14 is a flowchart illustrating a process 1400 for training AI/ML model(s), according to one or more embodiments. In some embodiments, the AI/ML model(s) may be generative AI models, per the above. In the case of neural networks, the architecture typically includes multiple layers of neurons, including input, output, and hidden layers. See FIGS. 12A and 12B, for example. The hidden layers in between process the input data and generate intermediate representations of the input that are used to generate the output. These hidden layers can include various types of neurons, such as convolutional neurons, recurrent neurons, and/or transformer neurons. Generative AI models may also have various layers.

The process 1400 performed in FIG. 14 may be performed by an automation as described herein implemented in a computer program in accordance with one or more embodiments. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., see FIG. 11) to implement all or part of the process 1400 described in FIG. 14, which may also be stored on the computer-readable medium.

The training process in some embodiments begins with providing data of diverse industries and applications, unique industry terminology, complex document structures, and enterprise-specific information with pretrained knowledge, etc., whether labeled or unlabeled, at block 1410. In the case of generative AI models, which are often generally trained, the training process may be skipped unless fine-tuned models are desired, as discussed in more detail below. The AI/ML model is then trained over multiple epochs at block 1420 and results are reviewed at block 1430. While various types of AI/ML models may be used, LLMs and other generative AI models are typically trained (fine-tuned) using a process called "supervised learning", which is also discussed above. Supervised learning involves providing the model with a large dataset, which the model uses to learn the relationships between the inputs and outputs. During the training process, the model adjusts the weights and biases of the neurons in the neural network to minimize the difference between the predicted outputs and the actual outputs in the training dataset.

One aspect of the models in some embodiments is the use of transfer learning. For instance, transfer learning may take advantage of a pretrained model, such as ChatGPT, which is fine-tuned on a specific task or domain at block 1420. This allows the model to leverage the knowledge already learned from the pretraining phase and adapt it to a specific application via the training phase of block 1420.

The pretraining phase involves training the model on an initial set of training data that may be more general. During this phase, the model learns relationships in the data. In the fine-tuning phase (e.g., performed during block 1420 in addition to or in lieu of the initial training phase in some embodiments if a pretrained model is used as the initial basis for the final model), the pretrained model is adapted to a specific task or domain by training the model on a smaller dataset that is specific to the task. For instance, in some embodiments, the model may be focused on certain types(s) of data sources. This may help the model to more accurately identify data elements therein than a generative AI model that is pretrained alone. Fine-tuning allows the model to learn the nuances of the source, such as the specific vocabulary and syntax, certain graphical characteristics, certain data formats, etc., without requiring as much data as would be necessary to train the model from scratch. By leveraging the knowledge learned in the pretraining phase, the fine-tuned model can achieve state-of-the-art performance on specific tasks with relatively little additional training data.

If the AI/ML model fails to meet a desired confidence threshold at decision block 1440 in some embodiments, the process 1400 proceeds to block 1450 (as shown by the NO arrow). The training data is supplemented and/or the reward function is modified to help the AI/ML model achieve its objectives better at block 1450 and the process 1400 returns to block 1420.

If the AI/ML model meets the confidence threshold at decision block 1440, the process 1400 proceeds to block 1460 (as shown by the YES arrow). The AI/ML model is tested on evaluation data at block 1460 to ensure that the AI/ML model generalizes well and that the AI/ML model is not over fit with respect to the training data. The evaluation data includes information that the AI/ML model has not processed before.

If the confidence threshold is met at decision block 1470 for the evaluation data, the process 1400 proceeds to block 1480 (as shown by the YES arrow). The AI/ML model is deployed at 1480. If not, the process 1400 returns to block 1450 (as shown by the NO arrow) and the AI/ML model is trained further.

Figure 15:
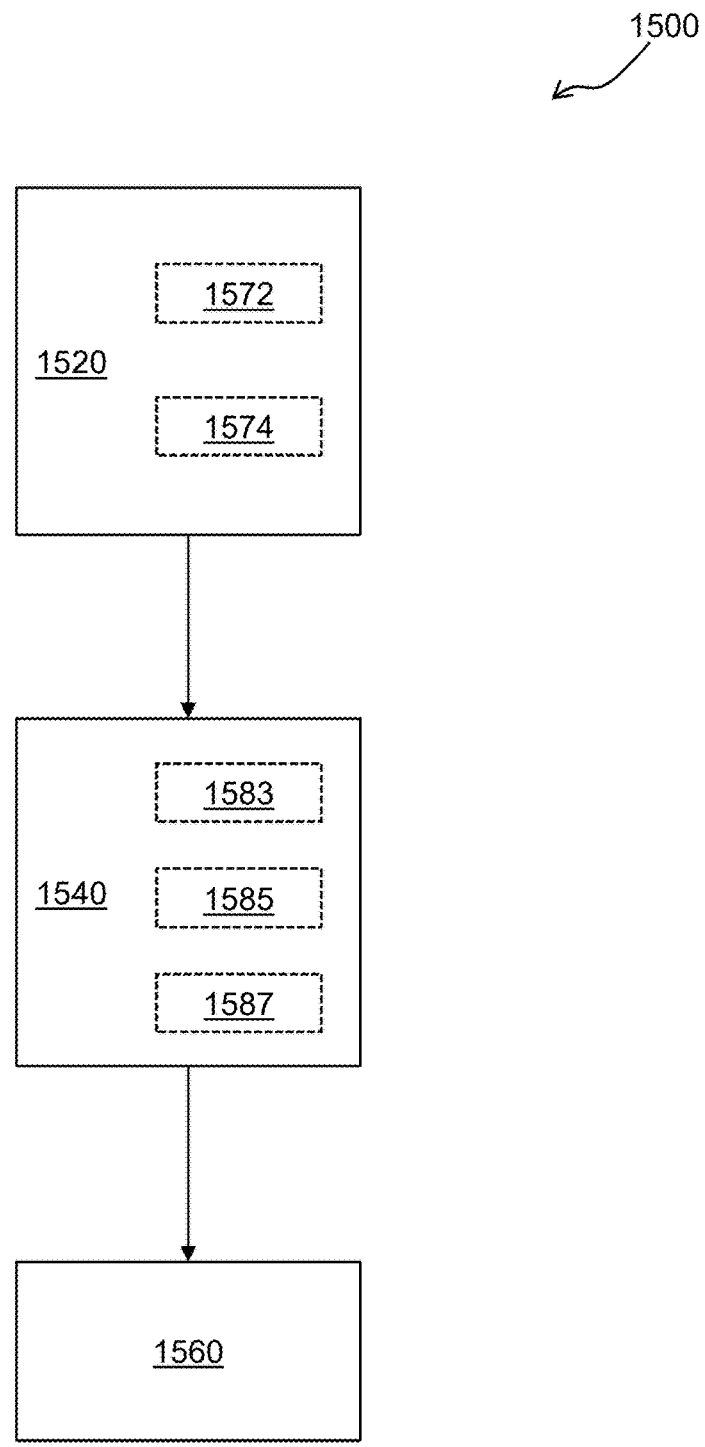
FIG. 15 depicts a process according to one or more embodiments.

FIG. 15 is a flowchart illustrating a process 1500 for advanced agentic extraction and searching for context grounding within automations according to one or more embodiments. The process 1500 performed in FIG. 15 may be performed by an automation as described herein (e.g., an AI agent, a AOP, or an RPA robot) implemented in a computer program in accordance with one or more embodiments. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., see FIG. 11) to implement all or part of the process 1500 described in FIG. 15, which may also be stored on the computer-readable medium.

The process 1500, in general, provides a context grounding methodology to improve AI models by integrating enterprise-specific information with pre-trained knowledge, enabling accurate responses to specialized or recent queries. The process 1500 includes extraction at block 1520, semantic storage at block 1540, and searching/computing at block 1530, which by way of example are described as implemented by an agentic automation performed by one or more AI agents. According to one or more technical effects, benefits, and advantages of the process 1500 include, but are not limited to, the one or more AI agents acting independently, adaptively, and dynamically to make decisions and execute actions to solve key challenges with ensuring effective retrieval and semantic matching to the specialized or recent queries. Accordingly, the one or more AI agents can decipher unique industry terminology and complex document structures, provide precise chunking of documents, and extract and search for relevant information therein with reduced processing and memory resources.

Beginning with block 1520, the one or more AI agents perform extraction operations. Extraction operations, in a general sense, include pulling, transferring, and converting data from one or more sources to text.

According to one or more embodiments, the one or more AI agents access (at subblock 1572) documents (including complex document structures) that are in different formats and in different places. An example of a document with a complex document structure includes, but is not limited to, a PDF that has images and complex tables therein. Access can include retrieving relevant data chunks from a document repository and integrating the relevant data chunks into prompts, as text, for AI models to enhance response accuracy.

The one or more AI agents extract (at subblock 1574) the data of the accessed documents. Extraction can include parsing each documents and converting the data to text. The one or more AI agents can implement one or more different methods of parsing different documents. Methods of parsing can include, but are not limited to, expressions, rule-based parsing, tokenization, named entity recognition (NER), part-of-speech (POS) tagging, semantic parsing, syntactic parsing, machine learning-based parsing, and other specialized document parsing techniques (table extraction and form recognition). The one or more AI agents can choose one or more parsing method based on the document and a desired level of information extraction. The one or more AI agents convert the data of the accessed documents to text because the text is utilized by an AI model to provide context grounding. By way of example, the data of the accessed documents is flattened into a representation that can be stored and retrieved. More particularly, for instance, PDFs have images and complex tables therein that the one or more AI agents flattened into text representation that are used in subsequent parts of the agentic automation.

At block 1540, the one or more AI agents perform semantic storage operations. Semantic storage of the text extracted at block 1520 by the one or more AI agents optimizes storage resources (e.g., databases) by intelligent allocation and management that improves the performance storage resources. Further, proper optimized semantic storage by the one or more AI agents enables essential semantic search and retrieval of the text.

According to one or more embodiments, the intelligent allocation and management of the one or more AI agents includes generating (at subblock 1583) vectors to store the text. The vector permit that use of content embeddings (e.g., vector embeddings) for different phrases or words of the text. In turn, the one or more AI agents (in some cases using a model or transformer) generate (at subblock 1585) the content embeddings. The content embeddings can take the form of a long vector of floating point numbers that is produced by running the text through a model or a transformer. By using a vectors, the one or more AI agents can utilize the content embeddings to quickly access the text, which saves processing time and improves processing accuracy. The one or more AI agents store (at subblock 1587) the vectors containing the text with the content embeddings.

At block 1560, the one or more AI agents perform searching/computing operations. The searching/computing operations of the one or more AI agents include advanced agentic searching, for example, semantic search and retrieval, hybrid search, and broad search with re-ranking as described herein. Note that with the semantic storage of the vectors containing the text with the content embeddings comes a computing problem as conventional software automations are unable to adapt to the complexities of the vectors. For instance, a conventional software automation due to its static form is unable to search the vectors at runtime given without an extreme amount of processing power and processing time (that make the conventional software automation impracticable) to compute all of the floating point numbers.

The one or more AI agents solve this computing problem by performing an embedding search at runtime (using advanced agentic searching) by computing the vectors from the specialized or recent queries. Thus, advanced agentic searching retrieves information that is grounded to the context of the specialized or recent queries.

Figure 16:
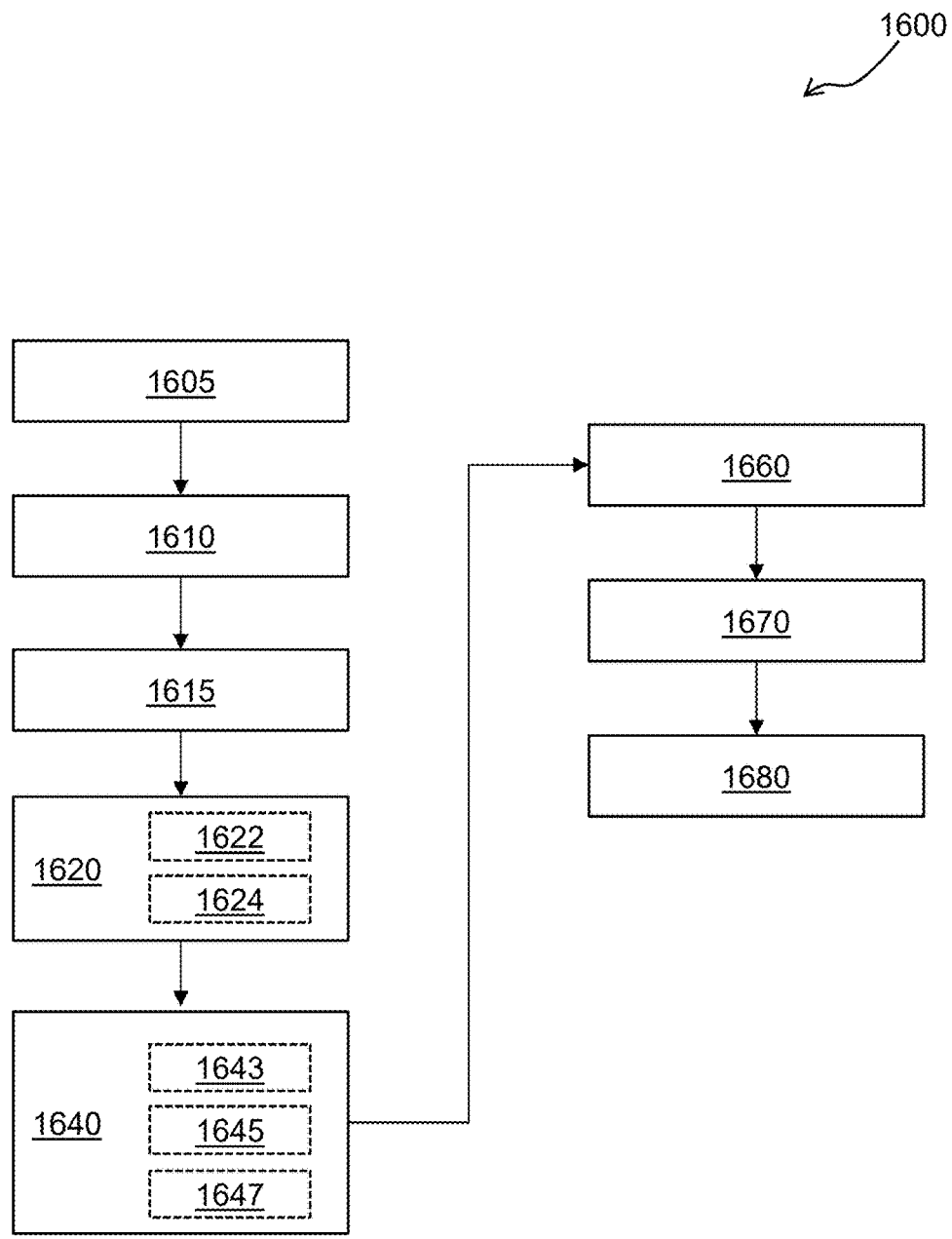
FIG. 16 depicts a process according to one or more embodiments.

FIG. 16 is a flowchart illustrating a process 1600 for advanced agentic extraction and searching for context grounding within automations according to one or more embodiments. The process 1600 performed in FIG. 16 may be performed by an automation as described herein (e.g., an AI agent, a AOP, or an RPA robot) implemented in a computer program in accordance with one or more embodiments. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., see FIG. 11) to implement all or part of the process 1600 described in FIG. 16, which may also be stored on the computer-readable medium.

According to one or more embodiments, the advanced agentic extraction and searching process 1600 provides context grounding as a mechanism for fixing a problem where an AI model, i.e., an LLM (e.g., a NLP model such as word2vec, BERT, GPT-3, ChatGPT), is asked something recent or something about data (whether in a private chat, a public chat, or combination thereof) and the LLM respond with "Sorry. I don't know about that". This problem can exist because training of the LLM is cut off is at a certain date. Context grounding is a way of supplementing the information that the LLM knows about from pre-training with private information amassed inside an enterprise. Further, the advanced agentic extraction and searching process 1600 for context grounding within automations can perform "on-the-fly", as the advanced agentic extraction and searching process 1600 is a way of retrieving chunks from documents so that he chucks can be added into the prompt that goes to chat of the LLM.

According to one or more embodiments, an agentic extraction and searching process 1600 is implemented by one or more AI agents to provide generate context grounding for an AI model. The advanced agentic extraction and searching process 1600 begins at block 1605, where the one or more AI agents receive a complex query (e.g., the specialized or recent queries). The complex query requiring information that is not accessible by the LLM. That is, the complex query can include complex syntax and multiple parts and parameters. The complex query require extensive and advanced logic for transforming data, working with subqueries, analyzing context, filtering, and generating accurate responses.

The one or more AI agents can receive the complex query through prompts. For instance, the complex query is received through a chat prompt of the LLM (whether in a private chat, a public chat, or combination thereof). Thus, because the complex query asks the LLM something recent or something about data external to the LLM, the complex query triggers the advanced agentic extraction and searching process 1600.

At block 1610, the one or more AI agents implement query decomposition. Query decomposition simplifies the specialized or recent queries into sub-queries (e.g., smaller parts) for better search and response aggregation. Query decomposition can include, but is not limited to, transforming the complex syntax and multiple parts and parameters of the specialized or recent queries into a relational algebra query, checking whether the relational algebra query is syntactically and semantically correct, and splitting a relational algebra query into multiple distinct sub-queries.

With the specialized or recent queries decomposed into the multiple distinct sub-queries, the advanced agentic extraction and searching process 1600 includes extraction, semantic storage, and searching/computing operations. While general examples of the extraction, semantic storage, and searching/computing operations are described herein, for example, with respect to FIG. 15 and blocks 1520, 1540, and 1560, the advanced agentic extraction and searching process 1600 provides further description of these operations.

At block 1615, the one or more AI agents access a document repository. The one or more AI agents access the document repository based on the multiple distinct sub-queries. The document repository can include one or more documents providing data. The data can be provided in complex document structures of the one or more documents. The documents with complex document structures can include PDFs with images or complex tables. The document repository can store at least two of the one or more documents in different places not accessible by the AI model. The at least two of the one or more documents can be in different formats (e.g., a PDF, a text file, and a webpage source code file).

At block 1620, the one or more AI agents extract data from the one or more documents. The one or more AI agents extract the data from the one or more documents. The one or more AI agents extract the data from the accessed document repository based on the multiple distinct sub-queries. According to one or more embodiments, the one or more AI agents extract the data by parsing (subblock 1622) each of the one or more documents, as described herein, and converting (subblock 1624) the data to text. According to one or more embodiments, converting the text can include generating one or more vectors and context embeddings for different phrases or words of the text. The content embeddings can include floating point numbers generated by running the text through a model or a transformer. The content embeddings can be inserted into the vectors.

At block 1630, the one or more AI agents implements semantic storage of the one or more vectors. The semantic storage contains a result of the extraction. The sematic storage is then used for advanced agentic searching that provides the context grounding to the LLM. According to one or more embodiment, the one or more AI agents implement semantic storage of the text as vectors including context embeddings in an agentic memory.

At block 1640, the one or more AI agents implements advanced agentic searching. The advanced agentic searching searches the agentic memory to generate context grounding. Thus, the advanced agentic searching retrieves information that is grounded to the context of the complex query.

Note that the semantic storage of the vectors containing the text with the content embeddings presents a computing problem to conventional software automations because conventional software automations are unable to adapt to the complexities of the vectors. For instance, a conventional software automation due to its static form is unable to search the vectors at runtime given without an extreme amount of processing power and processing time (that make the conventional software automation impracticable) to compute all of the floating point numbers.

The one or more AI agents solve this computing problem by performing an embedding search at runtime (using advanced agentic searching) by computing the vectors from the specialized or recent queries. The one or more AI agents go beyond exact matches or keyword to find vectors that have similar meaning to the specialized or recent queries by using the context embeddings.

As noted herein, the advanced agentic searching can include, but is not limited to, semantic search and retrieval 1643, hybrid search 1645, and broad search with re-ranking 1647.

Semantic search and retrieval 1643 matches queries to embeddings for contextual relevance. According to one or more embodiments, semantic search and retrieval 1643 includes, but is not limited to, accessing and recalling the text of the storage resources based on meaning and relationships (rather than just keywords of conventional software automations). For example, the one or more AI agents see how close that vector is to the other vectors that are in the storage resources, which is how the one or more AI agents perform the semantic search and retrieval 1643.

Hybrid search 1645 combines semantic and keyword search for improved results. As another example, the one or more AI agents perform the hybrid search 1645 that implements the vector computing of the semantic search and retrieval 1643 with keyword search to supplement the vector computing.

Broad search with re-ranking 1647 performs broad searches refined by an LLM for precision. As another example, the one or more AI agents perform broad search with LLM re-ranking (e.g., when many, many search results are requested and everything of relevance is returned by the broad search, but also scattered, the one or more AI agents can achieve precision by asking the LLM to re-rank everything of relevance to have the very, most relevant vectors come to the top).

At block 1660, the one or more AI agents outputs the context grounding. The context grounding can be outputted to the LLM (e.g., the AI model). According to one or more embodiments, the one or more AI agents provide the context grounding with the complex query to the LLM. According to one or more embodiments, the one or more AI agents provide the context grounding in the prompt with the complex query. The context grounding enhances a response accuracy of the LLM to the complex query.

At block 1670, the response to the complex query is received. The response is outputted by the LLM in reply to the context query. The response can be provided to the prompt. For instance, the response is received through the chat prompt of the LLM and the one or more AI agents can get the response from the chat prompt. The response can also be received directly by the one or more AI agents from the LLM.

At block 1680, the one or more AI agents implement tethering. Generally, while the advanced agentic extraction and searching process 1600 is working pretty well, there still may be a few like items that the one or more AI agents are getting wrong. Tethering is an offer to the user to come in and provide dynamic and/or direct user inputs.

According to one or more embodiments, tethering can include connecting one or more of the specialized or recent queries and/or the sub-queries (e.g., any complex query) to context for advanced response generations. Tethering can include human-in-the-loop operations that specify desired responses for certain queries, improving accuracy for future similar queries. Tethering can include automatic tethering, where the one or more AI agents perform targeted searches on one or more of the specialized or recent queries and/or the sub-queries and aggregate results, enhancing response quality.

According to one or more embodiments, tethering can include automatic tethering. Automatic tethering can include a further breakdown of the one or more of the specialized or recent queries and/or the sub-queries into simpler components to perform targeted searches and aggregate results, enhancing the context grounding and, in turn, the response quality. Automatic tethering takes advantage of the fact that something good was extracted for a particular query and performance cost for similar queries can be avoided going forward (e.g., auto tethering saves/caches results of any very expensive searches in agentic memory so the results can be called next time). By way of example, the agentic memory automatically tethers the context grounding and the agentic memory based on instructions from the one or more AI agents.

The advanced agentic extraction and searching process 1600, in general, provides a context grounding methodology to improve AI models by integrating enterprise-specific information with pre-trained knowledge, enabling accurate responses to specialized or recent queries. According to one or more technical effects, benefits, and advantages of the advanced agentic extraction and searching process 1600 include, but are not limited to, the one or more AI agents acting independently, adaptively, and dynamically to make decisions and execute actions to solve key challenges with ensuring effective retrieval and semantic matching to the specialized or recent queries. Accordingly, the one or more AI agents can decipher unique industry terminology and complex document structures, provide precise chunking of documents, and extract and search for relevant information therein with reduced processing and memory resources.

Figure 17:
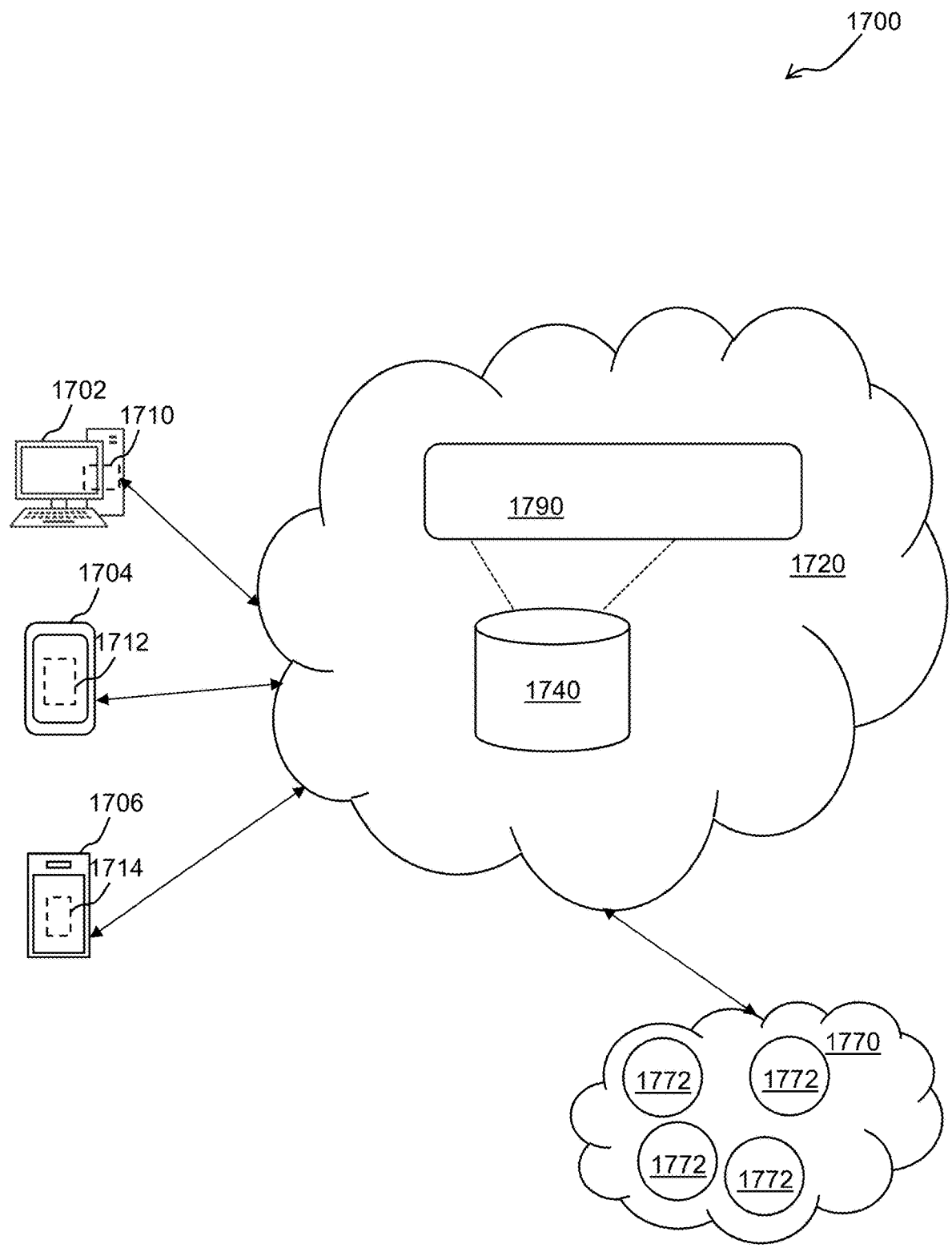
FIG. 17 is an architectural diagram illustrating a hyper-automation system configured to perform agentic automation and orchestration according to one or more embodiments.

FIG. 17 is an architectural diagram illustrating an agentic memory within a hyper-automation system 1700 according to one or more embodiments. In the hyper-automation system 1700, each computing system 1702, 1704, 1706 has respective automations 1710, 1712, 1714 running thereon, such as those implemented by RPA robots, AI agents, AOPs, etc. In some embodiments, the automations 1710, 1712, 1714 can be stored via a network 1720 remotely in a database 1740 and can access via a cloud environment 1770 one or more AI models 1772. The automations 1710, 1712, 1714 can further access an agentic memory 1790.

According to one or more embodiments, the agentic memory 1790 can provide a dynamic caching (i.e., storing) system for the automations 1710, 1712, 1714. The agentic memory 1790 can provide a dynamic caching (i.e., storing) system for the automations 1710, 1712, 1714 by being used for storing the context grounding generated by the enhanced extraction and search techniques, escalations, tool calls, dynamic and/or direct user inputs, and for caching other results produced by the automations 1710, 1712, 1714 and the one or more AI models 1772. In this way, the agentic memory 1790 solve the shortcomings of the one or more AI models 1772 by providing an improved and alternative storage approach for semantically mapping the context grounding and other results for use by the automations 1710, 1712, 1714 across the hyper-automation system 1700. In some case, the agentic memory 1790 acts as a long-term memory for the automations 1710, 1712, 1714

By way of example, if the automation 1710 is executing and runs into a problem where the automations 1710 can't proceed without input, then the automation 1710 executes an escalation for a human-in-the-loop operation. After the automations 1710 receives the dynamic and/or direct user inputs, the automations 1710 can save the escalation, the user inputs, and the solution in the agentic memory 1790. Accordingly, when the automation 1712 is executing and runs into the same or similar problem, then the automation 1712 semantically searches the agentic memory 1790 for the solution and the human-in-the-loop operation is never executed by the automation 1712. The technical effects, benefits, and advantages of the agentic memory 1790 is improved latency and processing, as well as overall performance. According to one or more embodiments, the one or more AI models 1772 can be trained on the data of the agentic memory 1790 in time. Though, even if the one or more AI models 1772 are trained every three (3) months or six (6) months, the agentic memory 1790 can always assist between training periods. And then over time, the agentic memory 1790 reduce a number of escalations and reduce user activity. Conventional software automations, in contrast, create more work for user overtime and then lose efficiency and cost more processing power and processing time.

Figure 18:
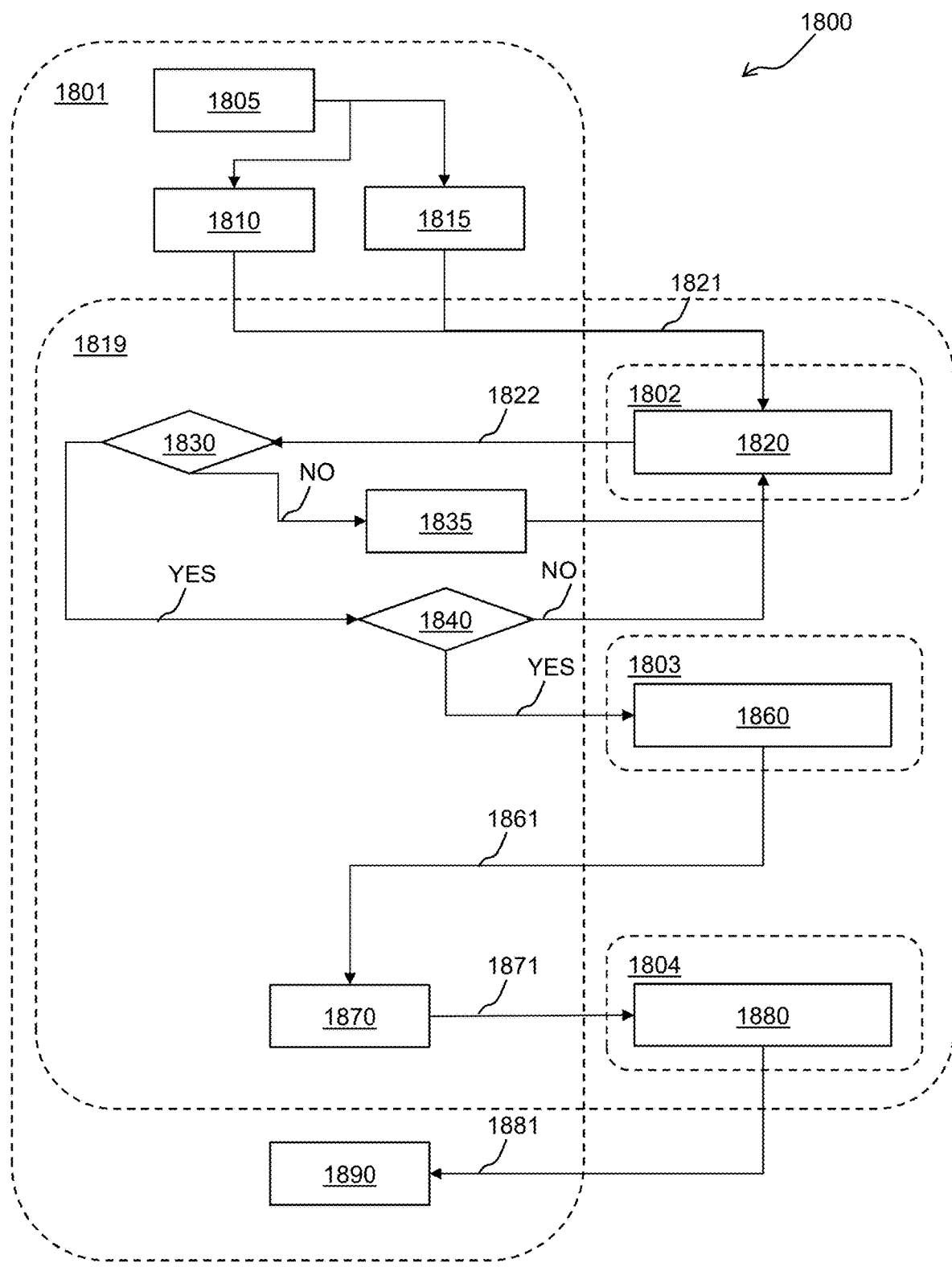
FIG. 18 depicts a process according to one or more embodiments.

FIG. 18 is a flowchart illustrating a process 1800 for an agentic extraction according to one or more embodiments. The process 1800 performed in FIG. 18 may be performed by an automation as described herein (e.g., an AI agent, a AOP, or an RPA robot) implemented in a computer program in accordance with one or more embodiments. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., see FIG. 11) to implement all or part of the process 1800 described in FIG. 18, which may also be stored on the computer-readable medium.

The process 1800 is implemented by one or more AI agents (e.g., an AI agent 1801) that utilize one or more AI models 1802, 1803, and 1804. According to one or more embodiments, the process 1800 for the agentic extraction is an example of the extraction at block 1520 of FIG. 15. The process 1800 is implemented by one or more AI agents 1801 to generate and provide a context grounding. The agentic extraction method is triggered in response to receiving a complex query requiring information not accessible by the AI model.

The process 1800 begins at block 1805, where one or more documents are received by the AI agent 1801. The one or more documents include complex document structures. For example, the one or more documents includes a PDF including the complex document structures (e.g., images, timelines, thought bubbles, and/or complex tables). According to one or more embodiments, at least two documents of the one or more documents are in different formats and located in different places not accessible by the one or more AI models 1802, 1803, and 1804.

At block 1810, the AI agent 1801 extracts text data from the one or more documents. At block 1815, the AI agent 1801 captures one or more images of the one or more documents.

At block 1819, the AI agent 1801 performs a multistage processing of the text data and the one or more images. The multistage processing utilizes the one or more AI models 1802, 1803, and 1804, which can include one or more large language models. The one or more large language models can include at least one multimodal large language model (MLLM). A MLLM is an AI model that can process and generate data from multiple modalities, such as text, images, audio, or video. According to one or more embodiments, the AI model 1802 is a first MLLM, the AI model 1803 is a second MLLM, and the AI model 1804 is an LLM. The multistage processing generates an output set. The output set can include a contextualization and one or more keywords.

At arrows 1821, the AI agent 1801 provides/feeds the text data and the one or more images to the first MLLM 1802. The AI agent 1801 can provides/feeds the text data and the one or more images to the first MLLM 1802 for reformatting with three or more draft output requests. The first MLLM 1802 generates one or more draft outputs from the text data and the one or more images. In this regard, the first MLLM 1802 processes the text data and the one or more images together to understand not just the text alone, but the text with its orientation within the one or more documents, to generate the one or more draft outputs. The one or more draft outputs are provided to the AI agent 1801. That is, as shown by the arrow 1822, the AI agent 1801 receives from the first MLLM 1802 the one or more draft outputs.

At decision block 1830, the AI agent 1801 compares each of the one or more draft outputs to a text threshold. The text threshold can be a set value. By way of example, the set value can be selected from a range of 50% to 100%. In one example, the set value can be 90%. Further, the comparison by the AI agent 1801 includes determining whether each draft output includes at least 90% of the text that was provided to the first MLLM 1802 at arrow 1821 (e.g., retain at least 90% of the words). When the text threshold is not met for a particular draft output, the AI agent 1801 can reengage the first MLLM 1802 to cause a reprocessing as shown by the 'NO' arrow proceeding through block 1835 to return to block 1820. Note, at block 1835, the AI agent 1801 discards the particular draft output that does not meet the text threshold. If a draft output meets the text threshold, then the AI agent 1801 accumulates the draft outputs for further checking, as shown by the 'Yes' proceeding to decision block 1840.

At decision block 1840, the AI agent 1801 determines whether at least two draft outputs exists (e.g., the first MLLM 1802 provided and the AI agent 1801 received two or more draft outputs). As shown by the 'NO' arrow returning to block 1820 from block 1840, the AI agent 1801 reengages the first MLLM 1802 to further process the text and one or more images when at least two draft outputs do not exist. As shown by the 'YES' arrow proceeding to block 1860 from block 1840, the AI agent 1801 provides/feeds the at least two draft outputs to the second MLLM 1803 when at least two draft outputs exist. The AI agent 1801 can provides/feeds the at least two draft outputs exist to the second MLLM 1803 for judging.

At block 1860, the second MLLM 1803 selects a best draft output selected from the one or more draft outputs. The best draft output most closely matches or describes the one or more documents compared to the remaining draft outputs. The best draft output is provided to the AI agent 1801. That is, as shown by the arrow 1862, the AI agent 1801 receives from the second MLLM 1803 the best draft output selected from the one or more draft outputs.

At block 1870, the AI agent 1801 extracts a final text from the best draft output. As shown by arrow 1871, the AI agent 1801 provides/feeds the final text to the third LLM 1804. Sending the final text to the third LLM 1804 causes the third LLM 1804, at block 1880 to generate one or more contextualizations and/or one or more keywords from the final text. As shown by arrow 1881, the AI agent 1801 receives from the third LLM 1804 the one or more contextualizations and/or the one or more keywords.

At block 1890, the AI agent 1801 generates an output set. The AI agent 1801 can generate the output set by concatenating the final text from the best draft output, the one or more contextualizations, and the one or more keywords.

After the conclusion of the process 1800 for the agentic extraction, the output set can be converted to one or more vectors, which include context embeddings, to provide the context grounding.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An agentic extraction method implemented by one or more artificial intelligence (AI) agents to generate and provide a context grounding for an AI model to enhance response accuracy of the AI model, the agentic extraction method comprising:
    extracting text data from one or more documents comprising complex document structures in response to receiving a complex query and performing a query decomposition that transforms a complex syntax and multiple parts and parameters of the complex query into a relational algebra query;
    capturing one or more images of the one or more documents;
    performing a multistage processing of the text data and the one or more images utilizing two or more large language models (LLMs) to generate an output set comprising a contextualization and one or more keywords by:
    generating two or more draft outputs, by using a first multimodal large language model (MLLM) in a first stage, based on providing the text data and the one or more images as inputs to the first MLLM, and generating a best draft output, by using a second MLLM in a second stage, selected from two or more draft outputs; and converting the output set to one or more vectors comprising context embeddings to provide the context grounding with the complex query to the AI model to enhance response the accuracy of the AI model,
    wherein the complex query requires information that is not accessible by the AI model, and wherein the query decomposition transforms the complex syntax and the multiple parts and parameters of the complex query into the relational algebra query, checks whether the relational algebra query is syntactically and semantically correct, and splits the relational algebra query into multiple distinct sub-queries.

2. The agentic extraction method of claim 1, wherein the two or more LLMs comprises at least three LLMs and the multistage feeding comprises:
    receiving, from a third large language model of the two or more LLMs, and adding the contextualization and one or more keywords to the output set.

3. The agentic extraction method of claim 2, wherein the one or more AI agents determines that at least two draft outputs are received from the first MLLM.

4. The agentic extraction method of claim 2, wherein the one or more AI agents compare each of the one or more draft outputs to a text threshold, and wherein the one or more AI agents reengage the first MLLM when the text threshold is not met, and
    wherein the one or more AI agents engage the second MLLM when the text threshold is met.

5. The agentic extraction method of claim 2, wherein the one or more AI agents extract text from the best draft output and sends the text extracted from the best draft output to the third LLM.

6. The agentic extraction method of claim 2, wherein the one or more AI agents generate the output set by concatenating text from a best draft output and the contextualization and one or more keywords.

7. The agentic extraction method of claim 1, wherein at least two documents of the one or more documents are in different formats and located in different places not accessible by the AI model.

8. The agentic extraction method of claim 1, wherein the one or more documents comprise at least one portable document format document comprising images or complex tables as the complex document structures.

9. The agentic extraction method of claim 1, wherein the agentic extraction method is triggered in response to receiving of the complex query requiring information not accessible by the AI model.

10. The agentic extraction method of claim 1, wherein the one or more AI agents implements a semantic storage of the text in one or more vectors comprising the context embeddings for different phrases or words of the text.

11. The agentic extraction method of claim 1, wherein the one or more AI agents implement semantic storage of the one or more vectors for advanced agentic searching that provides the context grounding to the AI model.

12. The agentic extraction method of claim 1, wherein the one or more AI agents implements a semantic search and retrieval of the text to generate the context grounding.

13. The agentic extraction method of claim 1, wherein the context embeddings of the one or more vectors comprise floating point numbers generated by running the text through a model or a transformer.

14. The agentic extraction method of claim 1, wherein the one or more AI agents comprise AI-enhanced probabilistic automations that act independently, act dynamically, make decisions, execute actions, and act adaptively to perform the agentic extraction method.

15. An agentic extraction method implemented by one or more artificial intelligence (AI) agents to generate an output set for a context grounding for an AI model to enhance response accuracy of the AI model, the agentic extraction method comprising:
    extracting text data from one or more documents comprising complex document structures in response to receiving a complex query and performing a query decomposition that transforms a complex syntax and multiple parts and parameters of the complex query into a relational algebra query;
    capturing one or more images of the one or more documents;
    capturing one or more images of the one or more documents;
    performing a multistage processing to generate the output set comprising a contextualization and one or more keywords by:
    generating two or more draft outputs, by using a first multimodal large language model (MLLM) in a first stage, based on providing the text data and the one or more images as inputs to the first MLLM;
    generating a best draft output, by using a second MLLM in a second stage, selected from two or more draft outputs; and
    generating one or more contextualizations and one or more keywords by a third large language model (LLM) in a third stage using a final text of the best draft output; and
    generating the output set by concatenating the final text, the one or more contextualizations, and one or more keywords to provide the context grounding with the complex query to the AI model to enhance response the accuracy of the AI model, wherein the complex query requires information that is not accessible by the AI model, and wherein the query decomposition transforms the complex syntax and the multiple parts and parameters of the complex query into the relational algebra query, checks whether the relational algebra query is syntactically and semantically correct, and splits the relational algebra query into multiple distinct sub-queries.

16. The agentic extraction method of claim 15, wherein the one or more AI agents determines that at least the two or more draft outputs are received from the first MLLM.

17. The agentic extraction method of claim 15, wherein the one or more AI agents compare each of the two or more draft outputs to a text threshold.

18. The agentic extraction method of claim 1, wherein the two or more LLM comprise at least three multimodal large language models (MLLMs) that process multiple different modalities of the one or more documents to enhance response accuracy of the AI model.

19. The agentic extraction method of claim 1, wherein the one or more AI agents implements a semantic search and retrieval of the text to generate the context grounding.

* * * * *